(12) United States Patent
Suzuki et al.

(10) Patent No.: US 7,545,845 B2
(45) Date of Patent: Jun. 9, 2009

(54) WIRELESS COMMUNICATION SYSTEM, WIRELESS TRANSMITTER, WIRELESS RECEIVER, WIRELESS COMMUNICATION METHOD, WIRELESS TRANSMISSION METHOD AND WIRELESS RECEPTION METHOD

(75) Inventors: Kenji Suzuki, Kanagawa (JP); Mamoru Ugajin, Tokyo (JP); Tsuneo Tsukahara, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 755 days.

(21) Appl. No.: 10/511,690

(22) PCT Filed: Feb. 5, 2004

(86) PCT No.: PCT/JP2004/001168

§ 371 (c)(1),
(2), (4) Date: Oct. 14, 2004

(87) PCT Pub. No.: WO2004/070981

PCT Pub. Date: Aug. 19, 2004

(65) Prior Publication Data

US 2005/0249264 A1    Nov. 10, 2005

(30) Foreign Application Priority Data

Feb. 5, 2003   (JP) ............................. 2003-027913
Sep. 8, 2003   (JP) ............................. 2003-315154

(51) Int. Cl.
*H04B 1/00* (2006.01)
(52) U.S. Cl. ............... 375/130; 375/146; 375/147; 375/150; 375/219; 375/295; 375/316; 375/340; 375/343; 375/351

(58) Field of Classification Search ............... 375/130, 375/135, 146, 238–239, 219, 289, 295, 259, 375/150, 147, 316, 324–325, 340, 343, 351
See application file for complete search history.

(56) References Cited

U.S. PATENT DOCUMENTS

| | | | | |
|---|---|---|---|---|
| 5,216,691 A | * | 6/1993 | Kaufmann | 375/150 |
| 5,677,927 A | * | 10/1997 | Fullerton et al. | 375/130 |
| 5,959,550 A | * | 9/1999 | Giles | 340/870.02 |
| 6,026,125 A | * | 2/2000 | Larrick et al. | 375/295 |
| 6,075,807 A | * | 6/2000 | Warren et al. | 375/143 |
| 6,181,729 B1 | * | 1/2001 | O'Farrell | 375/130 |

(Continued)

FOREIGN PATENT DOCUMENTS

JP    60-223361 A    11/1985

(Continued)

OTHER PUBLICATIONS

Ohba et al., "Radio Communication Device", Nihon Riko Shuppankai, pp. 141-265, ISBN 4-89019-136-4 May 1991.

*Primary Examiner*—Mohammad H Ghayour
*Assistant Examiner*—Sophia Vlahos
(74) *Attorney, Agent, or Firm*—Blakely, Sokoloff, Taylor & Zafman

(57) ABSTRACT

The transmitting side encodes a digital signal to be transmitted by using a code not containing any DC component, and transmits the digital signal without using any carrier. The receiving side performs decoding corresponding to encoding for the received signal, and restores the original digital signal.

5 Claims, 32 Drawing Sheets

U.S. PATENT DOCUMENTS

| | | | |
|---|---|---|---|
| 6,345,073 B1 * | 2/2002 | Curry et al. | 375/265 |
| 6,459,721 B1 * | 10/2002 | Mochizuki et al. | 375/130 |
| 6,636,567 B1 * | 10/2003 | Roberts et al. | 375/247 |
| 6,763,057 B1 * | 7/2004 | Fullerton et al. | 375/141 |
| 7,145,938 B2 * | 12/2006 | Takeuchi et al. | 375/147 |
| 7,257,148 B2 * | 8/2007 | Suzuki | 375/146 |

FOREIGN PATENT DOCUMENTS

| | | |
|---|---|---|
| JP | 06-029948 A | 2/1994 |
| JP | 10-508725 A | 8/1998 |
| JP | 2002-335188 A | 11/2002 |
| JP | 2002-353856 A | 12/2002 |
| JP | 10-529273 A | 9/2003 |
| JP | 10-535552 A | 11/2003 |

* cited by examiner

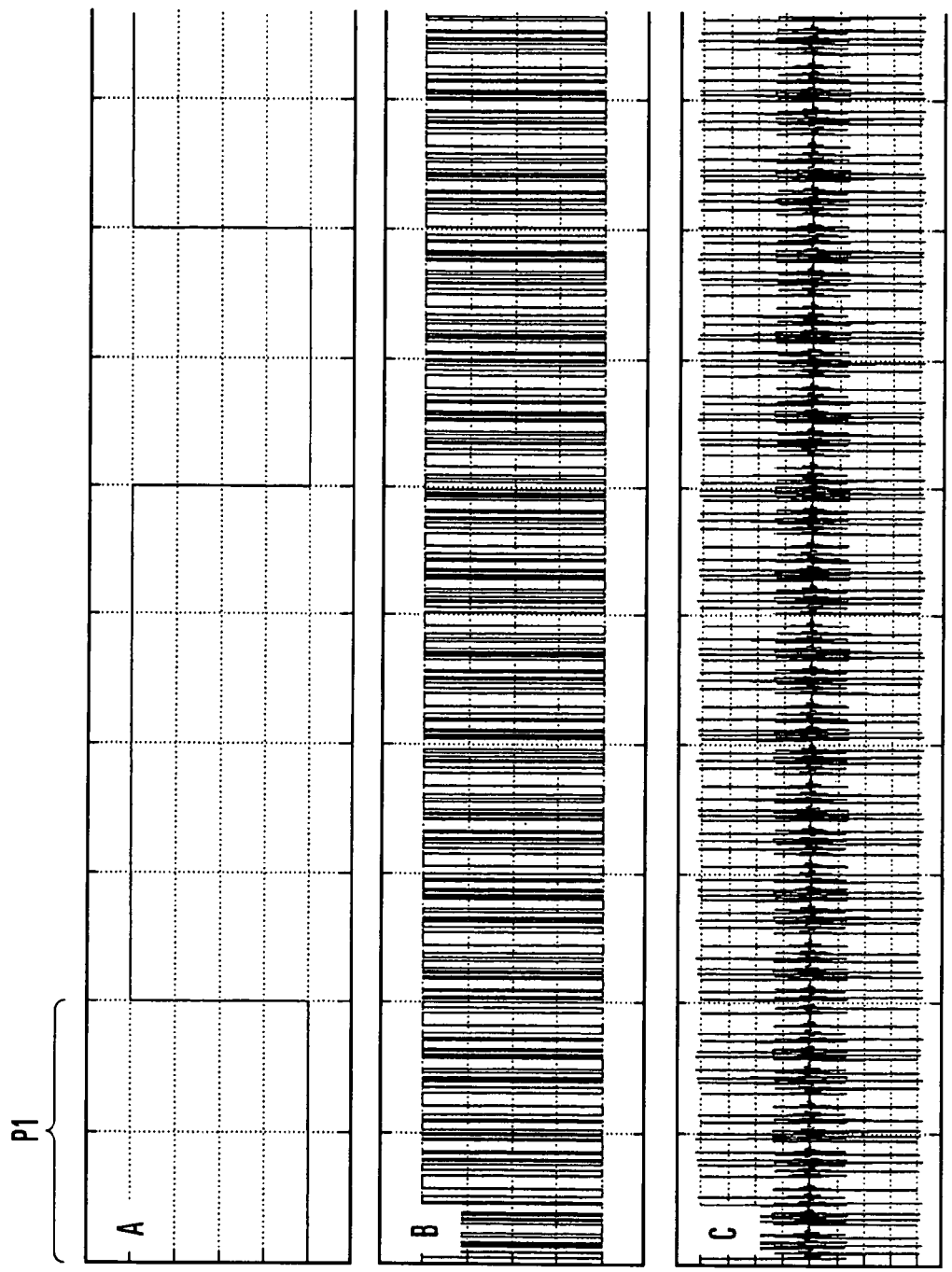

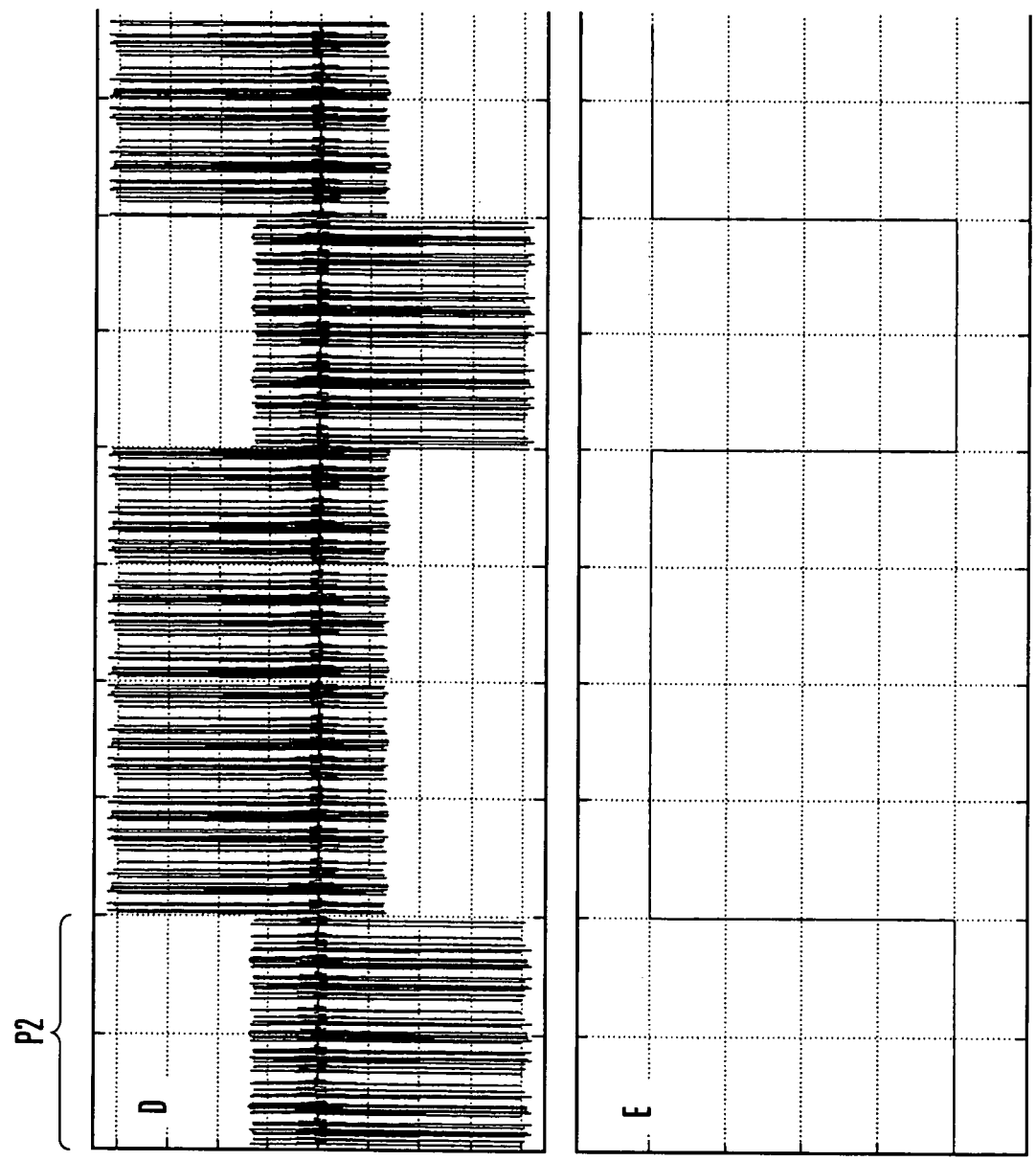

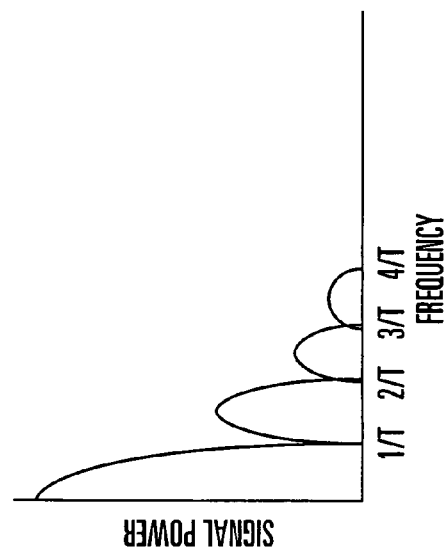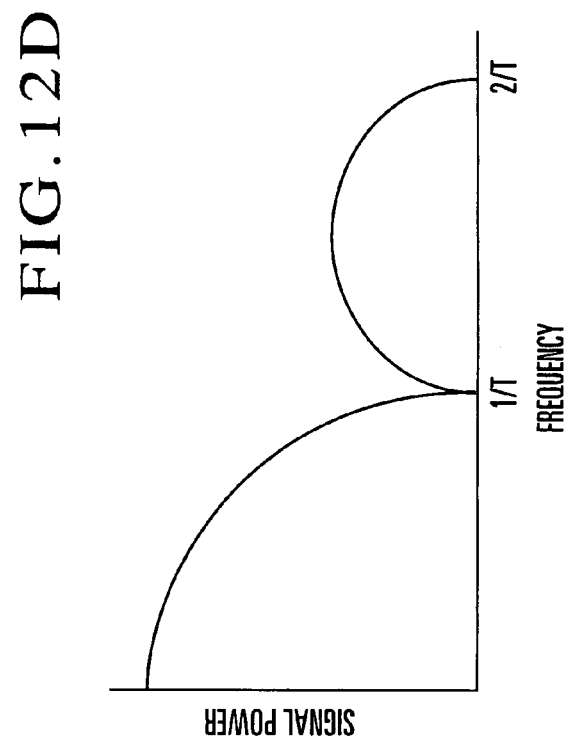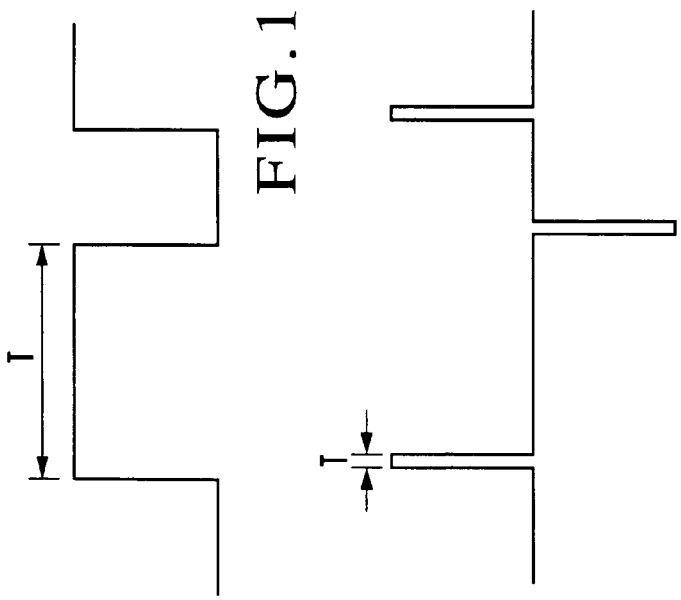

WIRELESS COMMUNICATION SYSTEM, WIRELESS TRANSMITTER, WIRELESS RECEIVER, WIRELESS COMMUNICATION METHOD, WIRELESS TRANSMISSION METHOD AND WIRELESS RECEPTION METHOD

The present patent application is a non-provisional application of International Application No. PCT/JP2004/001168, filed Feb. 5, 2004.

TECHNICAL FIELD

The present invention relates to a radio communication system, radio transmitter, radio receiver, radio communication method, radio transmission method, and radio reception method which transmit/receive digital signals by electromagnetic waves and, more particularly, to short-distance weak radio communication.

BACKGROUND ART

In radio communication, it is difficult to directly transmit a DC signal or low-frequency signal. In general, such a signal is transmitted by performing information modulation to a high-frequency carrier. More specifically, the transmitting side modulates a carrier by a signal wave to be transmitted, and transmits the modulated wave. The receiving side demodulates the received modulated wave to extract the signal wave from the carrier and obtain transmitted data (see, e.g., reference: Hideo Ohba & Hideki Sagesaka, "Radio Communication Device", Nihon Riko Shuppankai, pp. 141-265, ISBN 4-89019-136-4).

FIG. 32 shows an example of the configuration of a conventional radio communication system. In FIG. 32, a VCO (Voltage Controlled Oscillator) 1001 generates a carrier on the transmitting side. The carrier is modulated by multiplying the carrier by a baseband signal IN to be transmitted by a multiplier 1002. The modulated wave is amplified by a PA (Power Amplifier) 1005, and transmitted from a transmission antenna 1006. On the receiving side, the modulated wave received by a reception antenna 1011 is amplified by an LNA (Low Noise Amplifier) 1012, and the image component is rejected by an image rejection filter 1013. The modulated wave from which the image component is rejected is down-converted by multiplying by a multiplier 1017 the modulated wave by a carrier generated by a VCO 1016. The modulated wave passes through a channel selection filter 1018, and is converted by a detector 1019 into the transmitted baseband signal. FIG. 32 illustrates an example of radio communication by PSK (Phase Shift Keying). Also in another radio communication method, radio communication is generally done by generating a carrier and modulating/demodulating the carrier.

As a system which communicates without using any carrier, there has been proposed a radio communication system using the UWB (Ultra WideBand) technique (e.g., PCT(WO) 2003-529273 (WO 01/073965), and PCT(WO) 2003-535552 (WO 01/093441)). The UWB transmitter sends pulses of a very short time base 1,000,000,000 times or more per second in a very wide frequency band of several GHz. The receiver receives a sequence of pulses sent from the transmitter, and converts the pulses into data.

As described above, the conventional radio communication system shown in FIG. 32 generates a carrier in transmission and reception, modulates/demodulates the carrier, and communicates by radio. For this reason, the radio communication system requires a circuit for generating a carrier and a circuit for modulating/demodulating a carrier. The radio communication system becomes complicated, the scales of the transmitter and receiver which form the radio communication system and the hardware size increase, and the cost and power consumption of the radio communication system rise.

A radio communication system using UWB also requires a circuit for generating a monocycle waveform or Gaussian monopulse of a short time width. The design becomes difficult because a high-frequency analog circuit technique is necessary to form such a circuit. The scales of the transmitter and receiver which form the radio communication system and the hardware size increase, and the cost and power consumption of the radio communication system rise.

DISCLOSURE OF INVENTION

The present invention has been made to overcome the conventional drawbacks, and has as its object to provide a radio communication system, radio transmitter, radio receiver, radio communication method, radio transmission method, and radio reception method which can achieve a simple system, low cost, and low power consumption by obviating the needs for circuits for generating a carrier and modulating/demodulating a carrier.

A radio communication system according to the present invention comprises a radio transmitter and a radio receiver, the radio transmitter including encoding means for encoding a digital signal to be transmitted, and a transmission antenna which transmits the signal encoded by the encoding means, and the radio receiver including a reception antenna which receives the transmitted signal, and decoding means for performing decoding corresponding to encoding for the signal received by the reception antenna and restoring the digital signal, wherein communication is performed without using any carrier.

In an example of the configuration of the radio communication system according to the present invention, the encoding means encodes the digital signal to be transmitted by using a code not containing any DC component.

In another example of the configuration of the radio communication system according to the present invention, the encoding means comprises spreading means for performing a spread spectrum process by multiplying the digital signal to be transmitted by a spreading code and outputting the spread signal to the transmission antenna, and the decoding means comprises despreading means for performing despreading corresponding to the spread spectrum process for the signal received by the reception antenna and restoring the digital signal.

In still another example of the configuration of the radio communication system according to the present invention, the spreading code does not contain any DC component.

In still another example of the configuration of the radio communication system according to the present invention, the encoding means comprises spreading means for performing a spread spectrum process by multiplying the digital signal to be transmitted by a spreading code, and signal generation means for generating an impulse signal in response to rise and fall of a signal spread by the spreading means and outputting the impulse signal to the transmission antenna, and the decoding means comprises despreading means for performing despreading corresponding to the spread spectrum process for the signal received by the reception antenna, and peak detection means for detecting a peak of the signal despread by the despreading means and restoring the digital signal.

In still another example of the configuration of the radio communication system according to the present invention, the encoding means comprises spreading means for performing a spread spectrum process by multiplying the digital signal to be transmitted by a spreading code, and signal generation means for generating an impulse signal in response to rise and fall of a signal spread by the spreading means and outputting the impulse signal to the transmission antenna, and the decoding means comprises signal regeneration means for regenerating the spread signal from the signal received by the reception antenna, and despreading means for performing despreading corresponding to the spread spectrum process for the spread signal output from the signal regeneration means and restoring the digital signal.

In still another example of the configuration of the radio communication system according to the present invention, the encoding means comprises spreading means for performing a spread spectrum process by multiplying the digital signal to be transmitted by a spreading code, and signal generation means for generating an impulse signal in response to rise and fall of a signal spread by the spreading means and outputting the impulse signal to the transmission antenna, and the decoding means comprises signal regeneration means for regenerating the spread signal from the signal received by the reception antenna, despreading means for performing despreading corresponding to the spread spectrum process for the spread signal output from the signal regeneration means, and peak detection means for detecting a peak of the signal despread by the despreading means and restoring the digital signal.

In still another example of the configuration of the radio communication system according to the present invention, the encoding means comprises spreading means for performing a spread spectrum process by multiplying the digital signal to be transmitted by a spreading code, and signal generation means for generating an impulse signal in response to rise and fall of a signal spread by the spreading means and outputting the impulse signal to the transmission antenna, and the decoding means comprises despreading means for performing despreading corresponding to the spread spectrum process for the signal received by the reception antenna, integrating means for integrating the signal despread by the despreading means, and peak detection means for detecting a peak of the signal output from the integrating means and restoring the digital signal.

In still another example of the configuration of the radio communication system according to the present invention, the encoding means comprises spreading means for performing a spread spectrum process by multiplying the digital signal to be transmitted by a spreading code, and signal generation means for generating an impulse signal in response to rise and fall of a signal spread by the spreading means and outputting the impulse signal to the transmission antenna, and the decoding means comprises despreading means for performing despreading for the signal received by the reception antenna by using a spreading code corresponding to a differentiated spread signal, and peak detection means for detecting a peak of the signal despread by the despreading means and restoring the digital signal.

In still another example of the configuration of the radio communication system according to the present invention, letting $\Delta S$ be the differentiated spread signal, C be a spreading code corresponding to the spread signal $\Delta S$, P be a correlation value between the spread signal $\Delta S$ and the spreading code C, and M be a code length of the spreading code C, $$P \approx \sum_{k=1}^{M} \left( \Delta S_k \cdot \sum_{r=k}^{M} C_r \right)$$

is established.

In still another example of the configuration of the radio communication system according to the present invention, the signal generation means outputs only an impulse signal in an nth (n is an integer of not less than 2) harmonic band at a spread chip rate.

A radio transmitter according to the present invention comprises encoding means for encoding a digital signal to be transmitted, and a transmission antenna which transmits the signal encoded by the encoding means, wherein the digital signal is transmitted without using any carrier.

A radio receiver according to the present invention which receives a signal from a radio transmitter that encodes a digital signal to be transmitted and transmits the digital signal without using any carrier comprises a reception antenna which receives the transmitted signal, and decoding means for performing decoding corresponding to encoding for the signal received by the reception antenna and restoring the digital signal.

A radio communication method according to the present invention comprises the encoding step of encoding a digital signal to be transmitted, the transmission step of transmitting the signal encoded in the encoding step, the reception step of receiving the transmitted signal, and the decoding step of performing decoding corresponding to encoding for the signal received in the reception step and restoring the digital signal, wherein communication is performed without using any carrier.

A radio transmission method according to the present invention comprises the encoding step of encoding a digital signal to be transmitted, and the transmission step of transmitting the encoded signal, wherein the digital signal is transmitted without using any carrier.

According to the present invention, a radio reception method of receiving a signal from a transmitting side which encodes a digital signal to be transmitted and transmits the digital signal without using any carrier comprises the reception step of receiving the transmitted signal, and the decoding step of performing decoding corresponding to encoding for the signal received in the reception step and restoring the digital signal.

BRIEF DESCRIPTION OF DRAWINGS

FIG. 6A is a signal waveform chart showing a baseband signal in a radio transmitter according to the second embodiment of the present invention;

FIG. 6B is a signal waveform chart showing a spread signal in the radio transmitter;

FIG. 6C is a signal waveform chart showing a radio signal in the radio transmitter;

FIG. 8A is a signal waveform chart showing a despread signal in a radio receiver according to the second embodiment of the present invention;

FIG. 8B is a signal waveform chart showing a baseband signal in the radio receiver;

FIG. 12A is a signal waveform chart showing a spread signal input to a signal generation means according to the fourth embodiment of the present invention;

FIGS. 12B and 12C are signal waveform charts showing rectangular signals output from the signal generation means;

FIG. 12D is a graph showing the frequency spectrum of the spread signal;

FIG. 12E is a graph showing the frequency spectrum of the rectangular signal;

BEST MODE FOR CARRYING OUT THE INVENTION

Preferred embodiments of a radio communication system, radio transmitter, radio receiver, radio communication method, radio transmission method, and radio reception method according to the present invention will be described in detail below separately as the first to ninth embodiments with reference to the accompanying drawings.

First Embodiment

A radio communication system according to the first embodiment transmits/receives a digital signal without using a carrier by encoding a digital signal to be transmitted with a code not containing any DC component and transmitting the encoded signal on the transmitting side, and performing decoding corresponding to encoding for the received signal and restoring the digital signal on the receiving side. The first embodiment will be explained with reference to the accompanying drawings.

Figure 1:
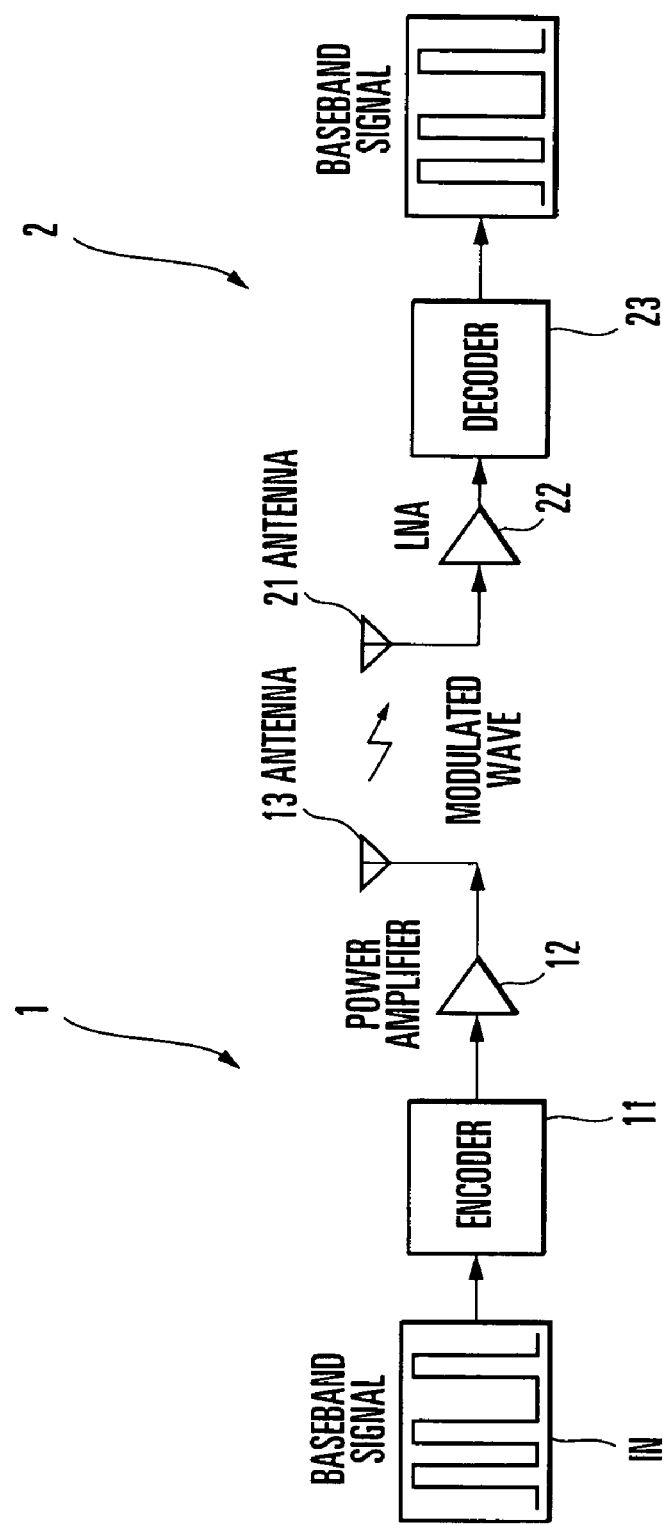
FIG. 1 is a block diagram showing the configuration of a radio communication system according to the first embodiment of the present invention.

FIG. 1 is a block diagram showing the configuration of a radio communication system according to the first embodiment. In FIG. 1, the radio communication system is formed from a radio transmitter 1 and radio receiver 2. The radio transmitter 1 comprises an encoder 11, power amplifier 12, and transmission antenna 13. The radio receiver 2 comprises a reception antenna 21, LNA 22, and decoder 23.

Figure 2:
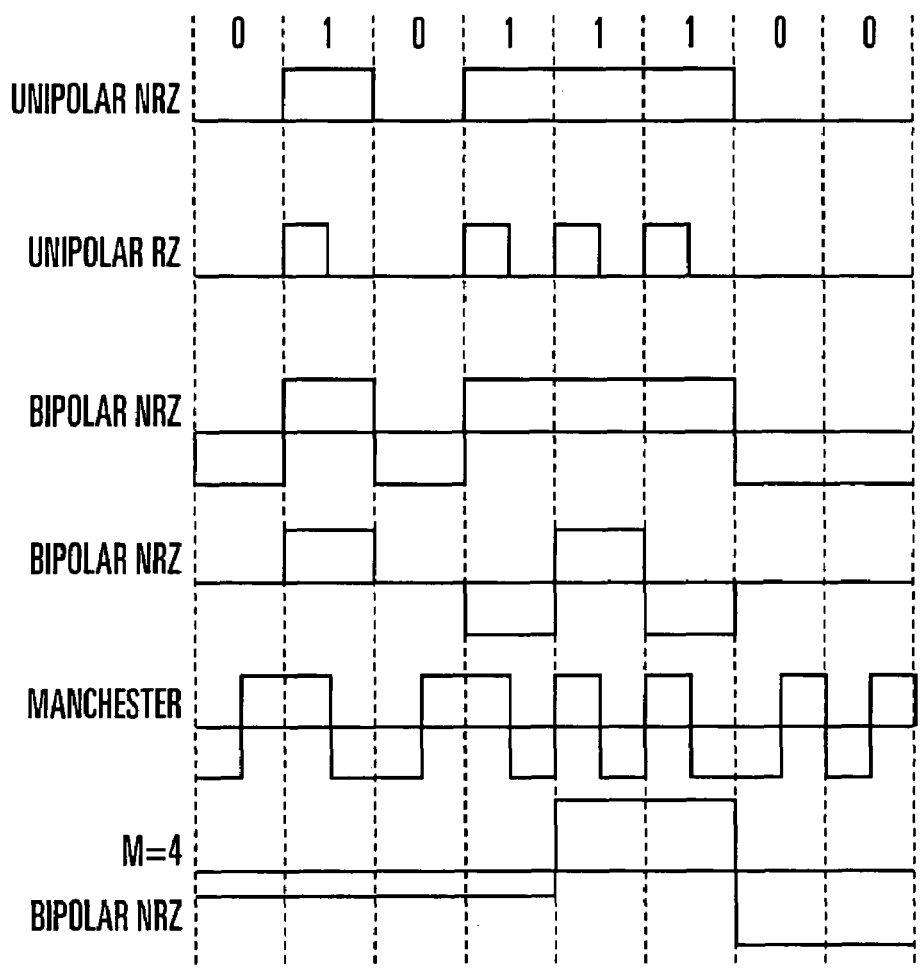
FIG. 2 is a chart showing various codes used in an encoder according to the first embodiment of the present invention.

The operation of the radio communication system will be explained together with the flow of a signal. In FIG. 1, a digital signal IN to be transmitted is input to the encoder 11. The digital signal IN to be transmitted may take any form as far as the signal IN represents binary information. The digital signal IN is generally a unipolar NRZ baseband signal, as shown in FIG. 2. The first embodiment also adopts a unipolar NRZ signal.

Figure 3:
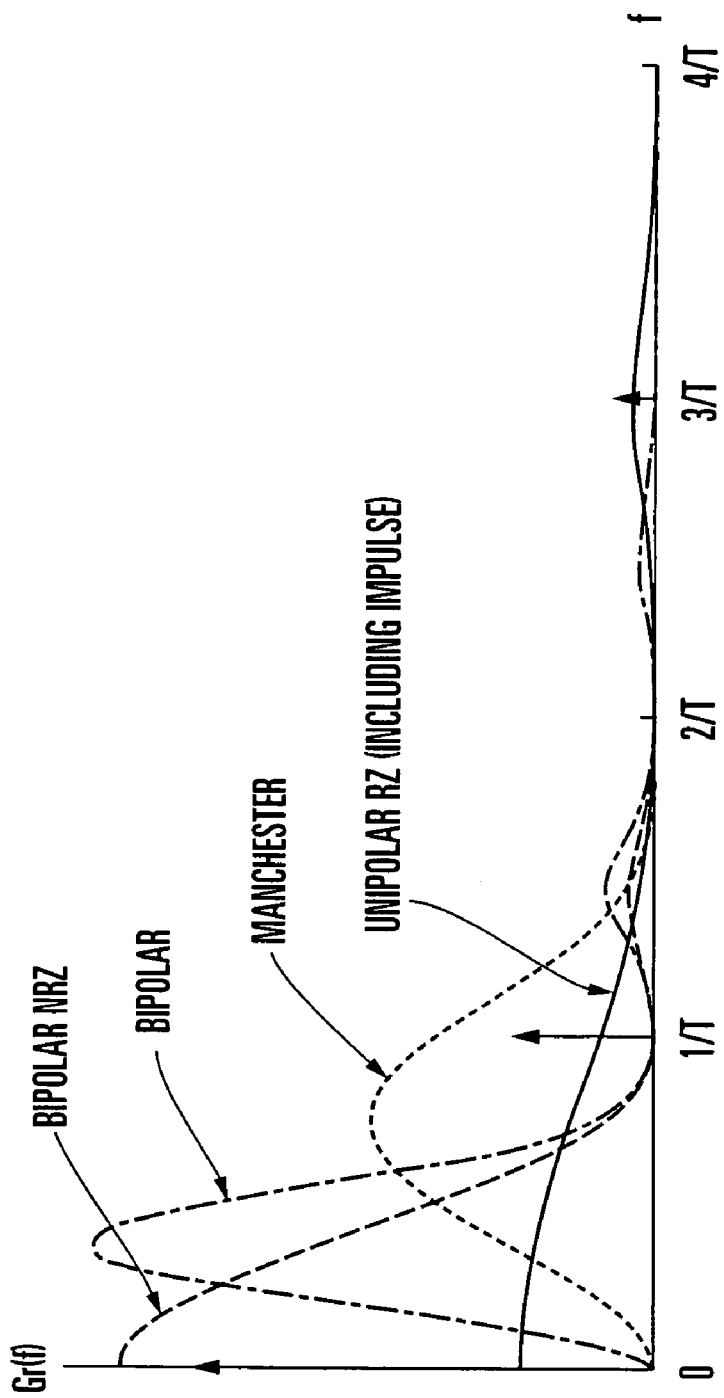
FIG. 3 is a graph showing the power spectrum characteristics of various codes used in the encoder according to the first embodiment of the present invention.

The encoder 11 encodes the input digital signal IN by using a code not containing any DC component. By encoding, a unipolar NRZ baseband signal having the peak of the power spectrum around the DC component is converted into a signal mainly containing an AC signal component of a relatively high frequency. Examples of the code not containing any DC component are a bipolar NRZ code (AMI code (Alternate Mark Inversion code)) and Manchester code (dipulse code or SP code) which are shown in FIG. 2, and in addition, a BnZS code (Bipolar with n Zeros Substitution code; n is an integer), an HDBn code (High Density Bipolar code; n is an integer), an mBnT code (m Binary on n Ternary code; m and n are integers), a CMI code (Coded Mark Inversion code), and a DMI code (Differential Mode Inversion code). However, the code is not limited to them. A unipolar NRZ (Non Return to Zero), a unipolar RZ (Return to Zero), and a bipolar NRZ (Non Return to Zero) which are shown in FIG. 2 have the main lobe of the power spectrum around DC, and are not appropriate as a code used in the first embodiment. FIG. 3 shows the power spectrum characteristics of various codes.

A signal encoded by the encoder 11 is supplied to the power amplifier 12. The power amplifier 12 amplifies the signal supplied from the encoder 11, and outputs it to the transmission antenna 13. In many cases, transmission signal power is strictly defined in short-distance weak radio communication. In this case, the power amplifier 12 is not always necessary. When transmission signal power exceeds a specified value even by directly supplying a signal output from the encoder 11 to the antenna 13, signal power may be adjusted by interposing an attenuator instead of the power amplifier 12. The power amplifier 12 adopted in the first embodiment amplifies the signal amplitude of a digital signal output from the encoder 11 without converting the digital signal. This eliminates the need for an analog circuit on the transmitting side, a simple transmitter design and low cost can be implemented.

The transmission antenna 13 transmits by radio a signal supplied from the power amplifier 12 (when the power amplifier 12 is not required, a signal supplied from the encoder 11). The transmission antenna 13 receives a rectangular digital signal regardless of the presence/absence of the power amplifier 12. Of the spectrum of the digital signal, a signal within the band of the transmission antenna 13 is transmitted as a radio signal. The antenna cannot propagate any DC signal component, and can propagate only an AC signal component. For this reason, of a digital signal to be transmitted, an AC component upon the rise/fall of a rectangular signal is mainly transmitted from the transmission antenna 13.

As described above, the radio transmitter 1 transmits the encoded baseband signal IN without using any carrier, particularly any analog high-frequency carrier. Hence, the radio transmitter 1 is not equipped with circuits necessary for using the carrier, such as a VCO for generating a carrier and a multiplier for multiplying a carrier by a baseband signal.

The receiving side will be explained. The reception antenna 21 receives a signal transmitted by the transmission antenna 13, and outputs the signal to the LNA 22. The LNA 22 amplifies the received signal supplied from the reception antenna 21 while suppressing noise, and outputs the signal to the decoder 23. The decoder 23 executes decoding corresponding to encoding by the encoder 11 for the signal input from the LNA 22, and restores the digital signal. The signal output from the LNA 22 is an analog signal, and when a digital signal is to be restored by analog operation, a signal output from the LNA 22 is directly used for operation. When a digital signal is to be restored by digital operation, a comparator or limiter is arranged in the decoder, and limits the signal to a predetermined amplitude so as to be close to a rectangular wave. After that, the amplitude-limited signal undergoes decoding corresponding to encoding by the encoder 11, restoring the digital signal.

In the first embodiment, the decoder 23 incorporates a comparator or limiter. However, the present invention is not limited to this configuration, and can take any configuration as far as a means for limiting the amplitude so as to be close to a rectangular wave after amplifying a received signal while suppressing noise can be implemented. For example, the LNA 22 may be equipped with a function equal to the comparator or limitter. Alternatively, an output from the LNA 22 may be digitized by an A/D converter to perform digital operation.

As described above, the radio receiver 2 receives a signal transmitted without using any carrier, particularly any analog high-frequency carrier. Thus, the radio receiver 2 does not comprise circuits necessary for using the carrier, such as a VCO for generating a carrier and a multiplier for multiplying a carrier by a reception signal.

The reason why radio communication can be done without using any carrier will be explained. Radio communication can transmit only an AC component, and cannot transmit any DC component. It is therefore difficult to transmit a baseband signal having the peak of the power spectrum around the DC component. To the contrary, a signal having the main lobe of the power spectrum in the AC component can be communicated as far as the AC signal component serving as the main lobe is transmitted/received even if no signal component around DC is not transmitted/received. From this, the radio transmitter 1 of the first embodiment encodes the digital signal IN to be transmitted by using a code not containing any DC component so that the main lobe of the power spectrum becomes an AC component. The first embodiment can implement radio communication using no carrier. More specifically, when a 150-MHz unipolar NRZ signal is encoded using a Manchester code, the main lobe of the power spectrum falls within a range of DC to 300 MHz. The power spectrum peaks in a relatively high frequency band (about several ten MHz to 200 MHz), and such a signal can be transmitted/received using a wideband antenna.

Since a longer antenna becomes more necessary for a lower frequency of the AC component, a digital signal to be transmitted preferably has a high frequency. For example, the frequency is preferably 1 MHz or more, and more preferably 100 MHz or more.

As described above, according to the first embodiment, the digital signal IN to be transmitted is encoded using a code not containing any DC component to convert the main lobe of the power spectrum of the transmission signal into a high-frequency AC component. Pulse transmission communication becomes possible, and radio communication is done without using any carrier. A VCO necessary to generate a carrier, a multiplier necessary for up conversion and down conversion, and the like can be eliminated. The hardware sizes of the radio transmitter 1 and radio receiver 2 which form the system are greatly reduced, and a simple system, low cost, and low power consumption can be implemented.

In particular, the radio transmitter 1 directly transmits a rectangular signal, and the main process of the radio transmitter 1 is a digital signal process. The number of analog circuits can therefore be greatly reduced, and the cost and power consumption can also be greatly reduced.

The first embodiment does not employ a pulse generator for generating a monocycle waveform or Gaussian pulse, and drives the transmission antenna by a digital rectangular signal. This method can select a frequency band used for communication in the band of an antenna for use. If an antenna whose center frequency is several hundred MHz is used, communication is done by transmitting/receiving radio waves in this frequency band. If an antenna whose center frequency is several GHz is used, communication is done by transmitting/receiving radio waves in this frequency band. In either case, the antenna for use is adjusted so that the main lobe of a baseband signal to be transmitted falls within the frequency band of the antenna for use. More specifically, a signal width T of a rectangular signal shown in FIG. 2 is decreased. With a small signal width T, the frequency components contained in the signal are distributed up to a higher frequency side. The signal width T is determined by a clock frequency supplied to the digital circuit, and the clock frequency can be controlled by a frequency synthesizer. According to this method, the antenna and the frequency synthesizer of the transmitter are controlled in accordance with a frequency band for use. Since the frequency synthesizer can be controlled by software, a hardware building component to be changed upon a change in frequency band for use is only the antenna. As described above, this method can change the frequency band for use by only switching the antenna without changing another hardware building component of the transmitter. In contrast to this, a conventional radio communication system using UWB requires a pulse generator for generating a monocycle waveform or Gaussian monopulse. The pulse generator is tuned and mounted so that the frequency component of the monocycle waveform or Gaussian monopulse falls within a predetermined frequency band. It is difficult to design such a pulse generator because it is formed from a high-frequency analog circuit. It is more difficult to design the pulse generator so that the frequency component of the monocycle waveform or Gaussian monopulse becomes changeable. That is, the conventional radio communication system using UWB must mount the pulse generator by tuning it to a frequency band used for communication. Even if an antenna for use is switched, it is difficult to change the pulse generator which is a hardware building component of the transmitter. The frequency band used for communication cannot be changed.

Second Embodiment

A radio communication system according to the second embodiment is almost the same as the radio communication system according to the first embodiment. The radio communication system according to the second embodiment is characterized in that the transmitting side performs a spread spectrum process by multiplying a digital signal to be transmitted by a spreading code, and the receiving side despreads a received signal. The second embodiment will be explained with reference to the accompanying drawings, and a description of a part common to the first embodiment will be omitted.

Figure 4:
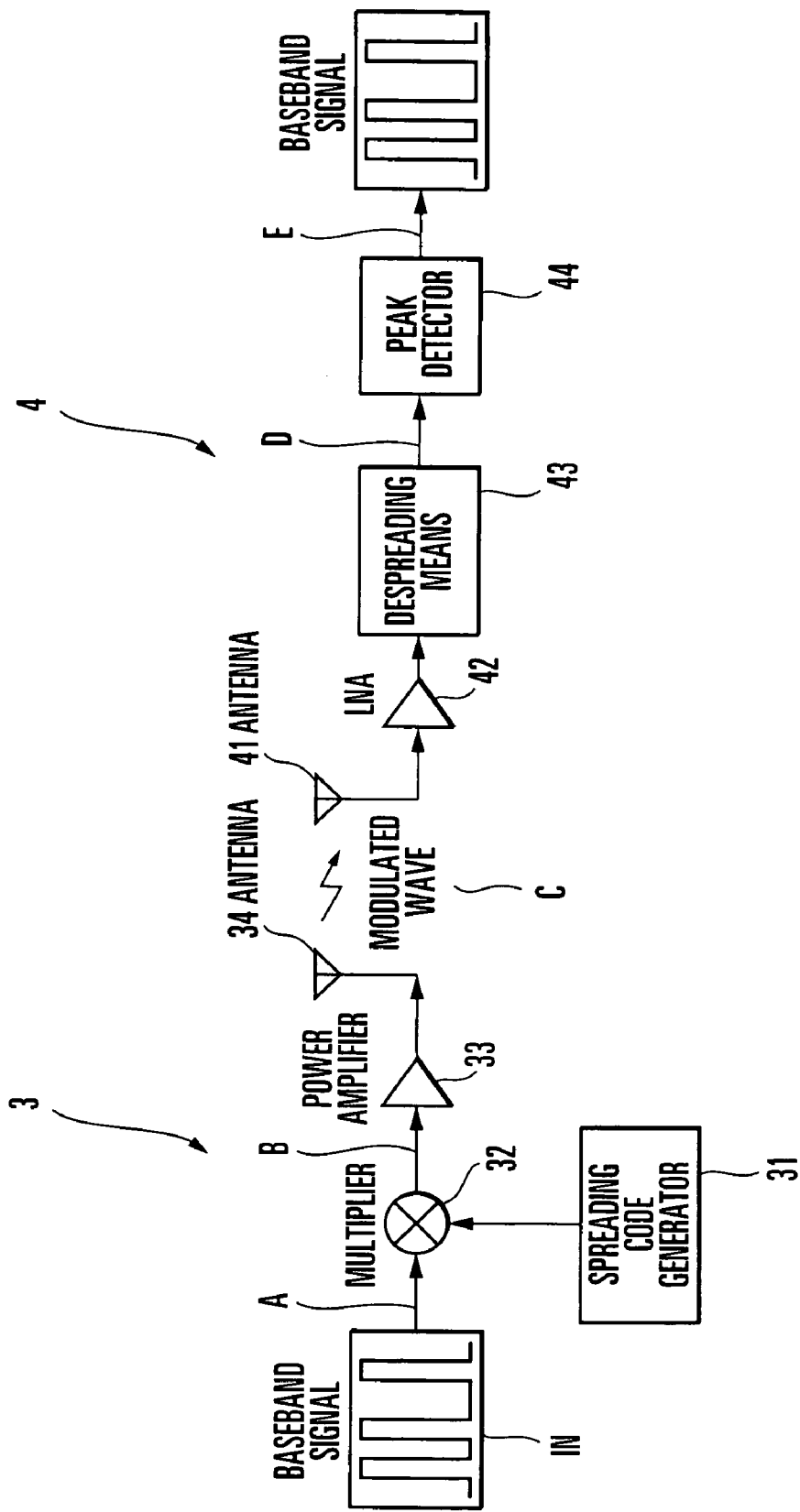
FIG. 4 is a block diagram showing the configuration of a radio communication system according to the second and third embodiments of the present invention.

FIG. 4 is a block diagram showing the configuration of the radio communication system according to the second embodiment. In FIG. 4, the radio communication system is formed from a radio transmitter 3 and radio receiver 4. The radio transmitter 3 comprises a spreading code generator 31, multiplier 32, power amplifier 33, and transmission antenna 34. The radio receiver 4 comprises a reception antenna 41, LNA 42, despreading means 43, and peak detector 44. In the second embodiment, the spreading code generator 31 and multiplier 32 form an encoder, whereas the despreading means 43 and peak detector 44 form a decoder.

The operation of the radio communication system will be explained together with the flow of a signal. In FIG. 4, a digital signal IN to be transmitted is input to the multiplier 32. The multiplier 32 performs a direct spread spectrum process by multiplying the input digital signal IN by a spreading code generated by the spreading code generator 31. In other words, the spreading code generator 31 and multiplier 32 function as a spreading means for performing the spread spectrum process by multiplying a digital signal to be transmitted by a spreading code. The direct spread spectrum process spreads a unipolar NRZ signal in a wide band. The spread signal is amplified by the power amplifier 33, and transmitted from the transmission antenna 34.

Similar to the first embodiment, the second embodiment does not always require the power amplifier 33. Even when the power amplifier 33 is necessary, a power amplifier which amplifies the signal amplitude of a digital signal without converting the digital signal is employed, similar to the first embodiment. The transmitter does not require any analog circuit, and a simple transmitter design and low cost can be achieved. In any case, a rectangular digital signal to be transmitted is supplied to the transmission antenna 34 in the second embodiment, similar to the first embodiment.

On the receiving side, a signal transmitted from the transmission antenna 34 is received by the reception antenna 41, amplified by the LNA 42, and supplied to the despreading means 43. The despreading means 43 performs despreading corresponding to the spread spectrum process in the radio transmitter 3. The peak detector 44 detects the peak of the signal output from the despreading means 43, and demodulates the digital signal on the basis of the detected peak.

Figure 5:
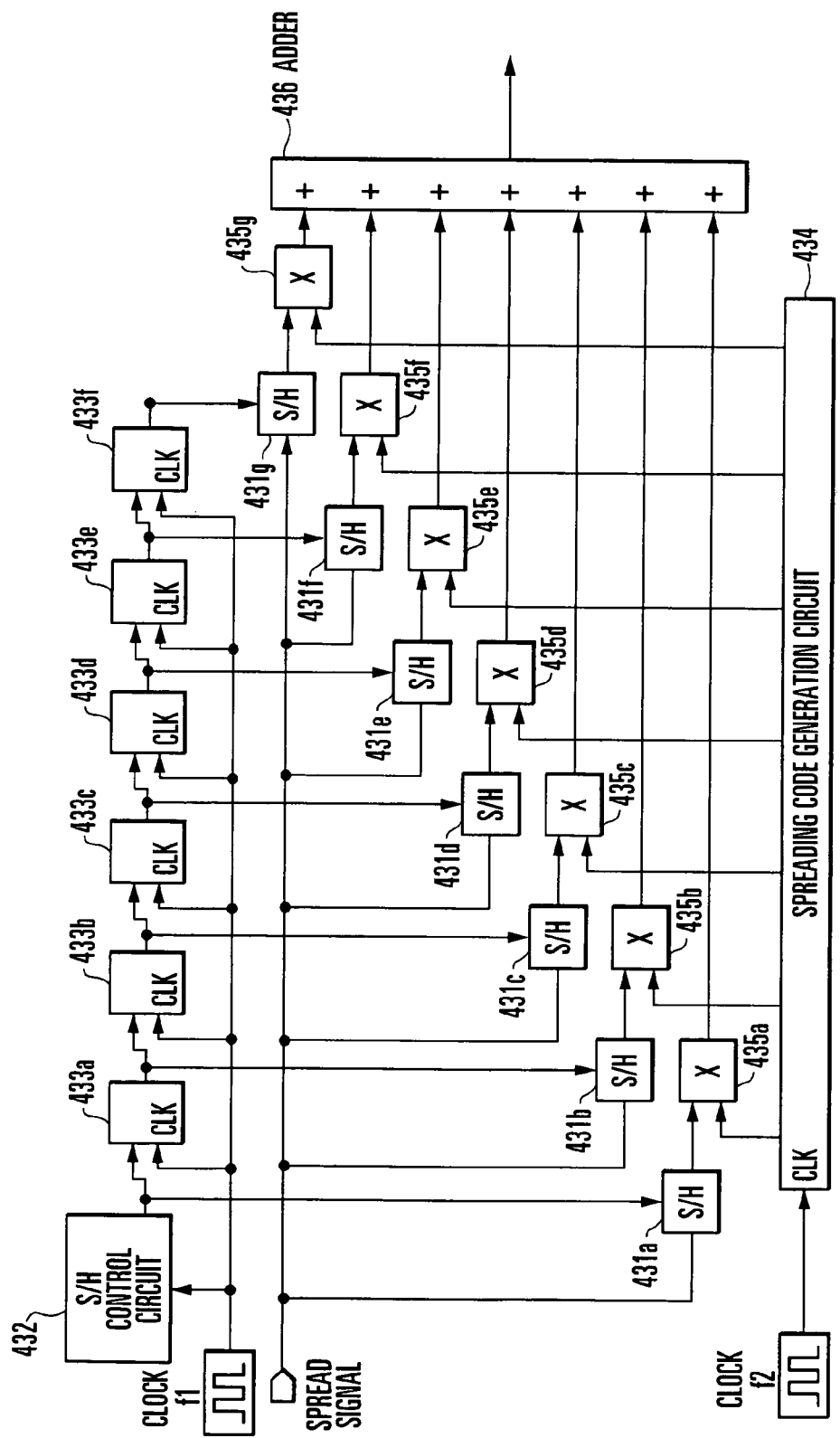
FIG. 5 is a block diagram showing an example of the configuration of a despreading means according to the second embodiment of the present invention.

FIG. 5 shows an example of the configuration of the despreading means 43 used in the second embodiment. The despreading means 43 comprises sample-and-hold circuits 431a to 431g which sample and hold a spread signal input from the LNA 42, a sample-and-hold control circuit 432 which receives a first clock f1 and controls to sequentially perform sample-and-hold operation by the sample-and-hold circuits 431a to 431g, flip-flop circuits 433a to 433f which form a shift register for shifting a signal output from the sample-and-hold control circuit 432 in synchronism with the clock f1, a spreading code generation circuit 434 which generates a spreading code to be correlated with a spread signal in synchronism with a second clock f2, multipliers 435a to 435g which multiply spread signals output from the sample-and-hold circuits 431a to 431g and a spreading code output from the spreading code generation circuit 434 for corresponding signals, and an adder 436 which adds signals output from the multipliers 435a to 435g. The first clock f1 has the same frequency as that of a clock used for spreading of a spread signal on the transmitting side, and the second clock f2 has the same frequency as that of a clock used for generation of a spreading code on the transmitting side.

The sample-and-hold control circuit 432 receives the first clock f1, and generates a sample-and-hold control signal for sampling and holding spread signals by only one clock for respective clocks equal in number to the multipliers 435a to 435g. While the flip-flop circuits 433a to 433f which form a shift register shift the sample-and-hold control signal output from the sample-and-hold control circuit 432 to the right in FIG. 5 in synchronism with the clock f1, the circuits 433a to 433f output the sample-and-hold control signal to the sample-and-hold circuits 431b to 431g. The sample-and-hold circuits 431a to 431g sequentially execute sample-and-hold operation in synchronism with the clock f1. The spreading code generation circuit 434 generates a spreading code in synchronism with the clock f2.

Spread signals which are input from the LNA 42 and held by the sample-and-hold circuits 431a to 431g, and a spreading code output from the spreading code generation circuit 434 are multiplied for corresponding signals by the multipliers 435a to 435g. The products from the multipliers 435a to 435g are added by the adder 436 to output the sum. In this manner, correlation value operation between a spread signal and a local spreading code is performed, and the peak detector 44 restores a baseband signal on the basis of the result of correlation value operation. The second embodiment adopts the configuration shown in FIG. 5 as an example of the despreading means 43, but the configuration is not limited to this as far as the same function can be obtained.

Figure 7A:
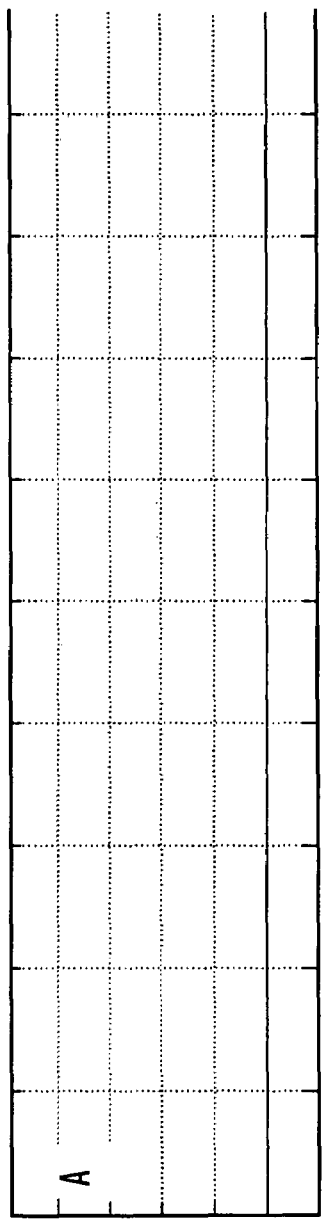
FIG. 7A is an enlarged signal waveform chart of FIG. 6A.
Figure 7B:
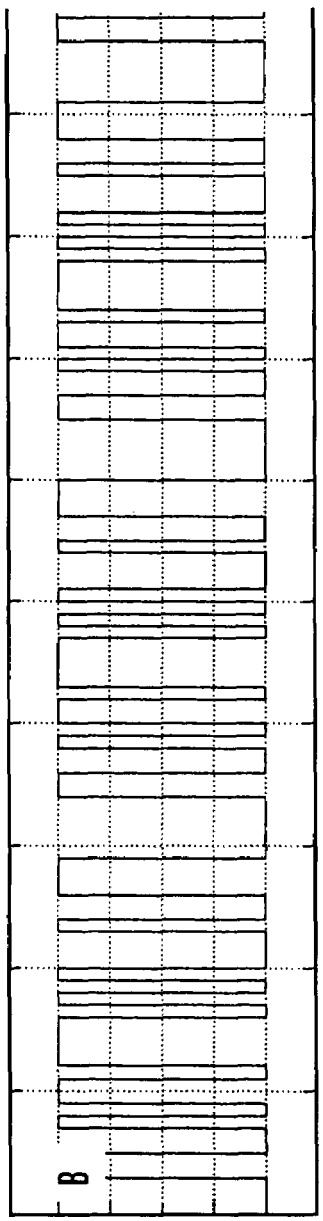
FIG. 7B is an enlarged signal waveform chart of FIG. 6B.
Figure 7C:
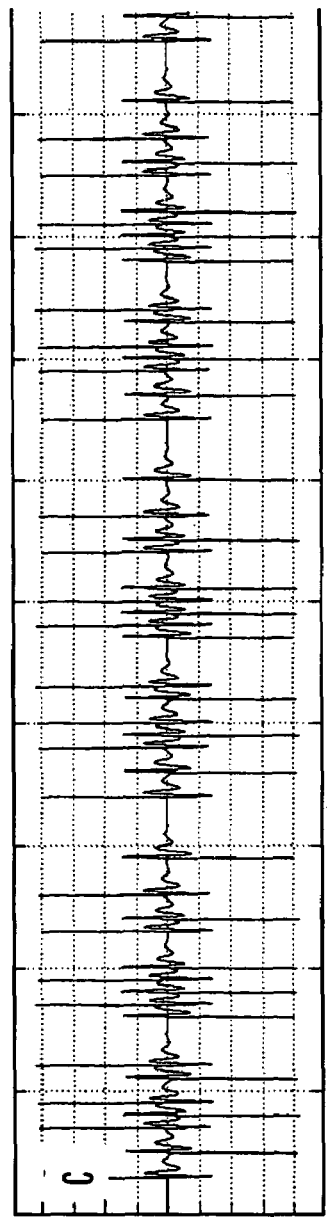
FIG. 7C is an enlarged signal waveform chart of FIG. 6C.

FIGS. 6 and 7 show representative signal waveforms at point A (input of the multiplier 32), point B (output of the multiplier 32), and point C (output of the transmission antenna 34) in the radio transmitter 3 of FIG. 4. FIG. 7 enlarges and illustrates a portion P1 of the signal waveform in FIG. 6. The ordinate in FIGS. 6 and 7 represents the signal strength, and the abscissa represents the time. A signal shown in FIGS. 6A and 7A is a digital signal IN to be transmitted. A signal shown in FIGS. 6B and 7B is a spread signal after the digital signal IN is spread by a spreading code. The transmission antenna 34 transmits as a radio signal an AC signal component contained in the rise and fall of the spread signal, as shown in FIGS. 6C and 7C.

Figure 9A:
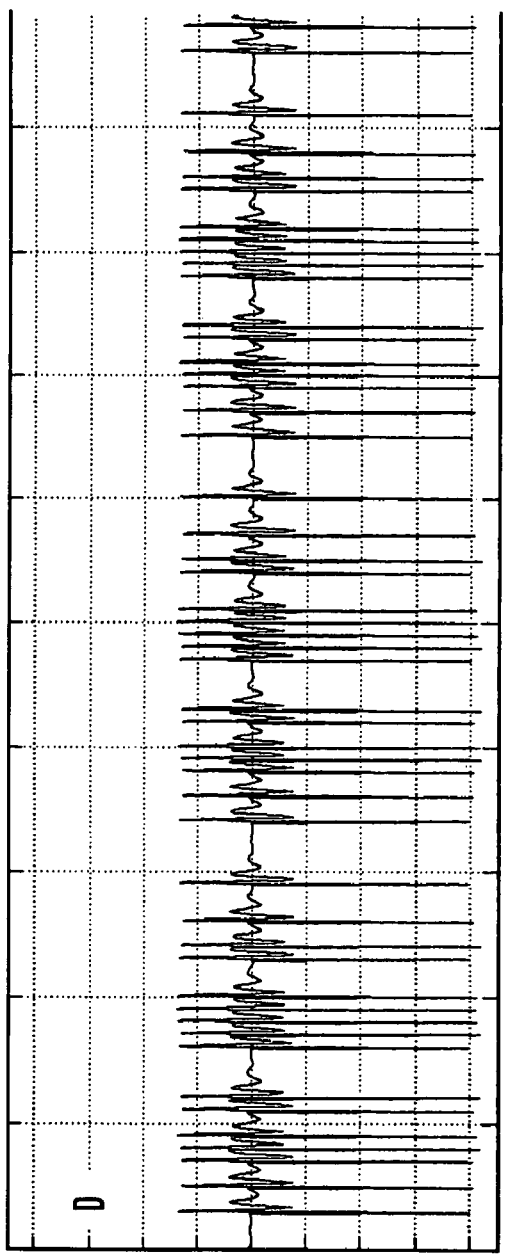
FIG. 9A is an enlarged signal waveform chart of FIG. 8A.
Figure 9B:
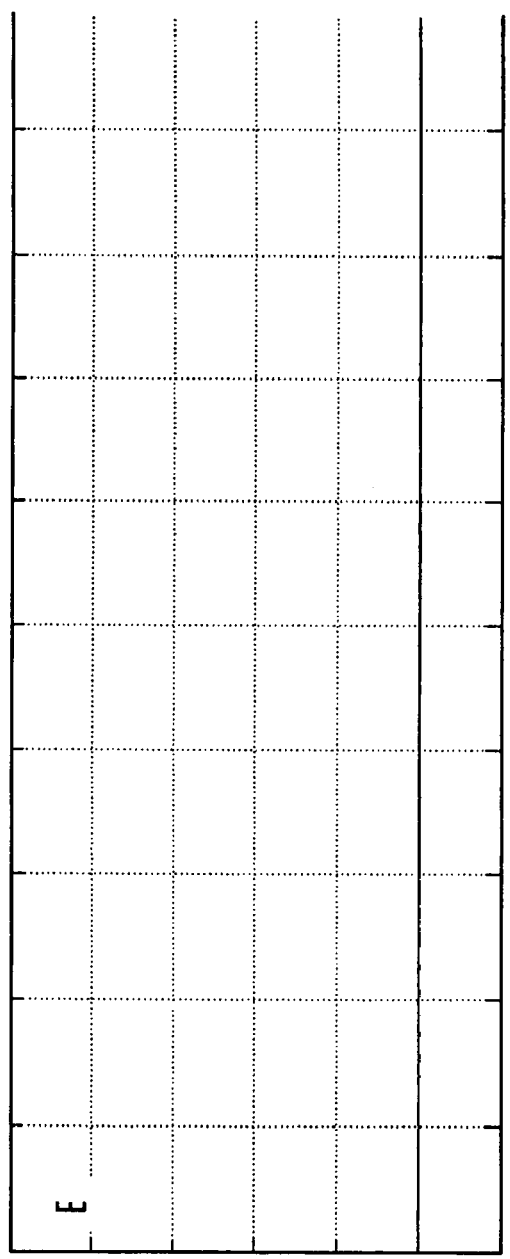
FIG. 9B is an enlarged signal waveform chart of FIG. 8B.

FIGS. 8 and 9 show representative signal waveforms at point D (output of the despreading means 43) and point E (output of the peak detector 44) in the radio receiver 4 of FIG. 4. FIG. 9 enlarges and illustrates a portion P2 of the signal waveform in FIG. 8. When a transmitted spread signal and local spreading code coincide with each other, a peak signal is output, as shown in FIGS. 8A and 9A. The phase of the peak signal is inverted in synchronism with phase inversion of the baseband signal. By detecting phase inversion of the peak signal by the peak detector 44, a transmitted baseband signal can be restored, as shown in FIGS. 8B and 9B.

As described above, similar to the first embodiment, the radio transmitter 3 and radio receiver 4 transmit and receive a signal without using any carrier, particularly any analog high-frequency carrier. The radio transmitter 3 and radio receiver 4 are not equipped with circuits necessary for using the carrier.

In the second embodiment, the digital signal IN to be transmitted is spread to a high frequency by the direct spread spectrum process, and radio communication can be done without using any carrier because of the same reason as that of the first embodiment. More specifically, when a 1-MHz unipolar NRZ signal is spread using a spreading code at a chip rate of 300 MHz, the main lobe of the spectrum of the spread signal extends from DC to 300 MHz. Note that the direct spread spectrum process enables communication when the ratio (SI ratio) of the reception power of a desired wave after despreading to the power of an interference wave is higher than an SI ratio necessary to obtain a required reception error rate. If a necessary SI ratio is ensured, all the main lobe need not be transmitted/received though an exchangeable frequency band depends on the band of an antenna for use. Communication is possible even when only the spectrum of a spread signal on a relatively high frequency side is transmitted/received.

Figure 10:
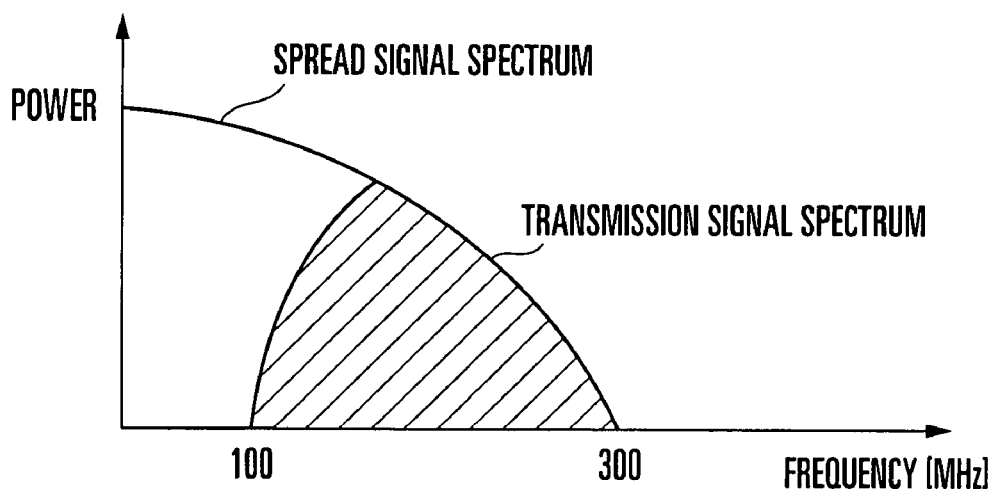
FIG. 10 is a graph showing a transmission signal spectrum according to the second embodiment of the present invention.

FIG. 10 shows a signal spectrum transmitted in the second embodiment. The main lobe of a baseband signal spread at a chip rate of 300 MHz extends from DC to 300 MHz. For example, when the band of an antenna for use varies from 100 MHz to 300 MHz, the signal spectrum to be transmitted is represented by a hatched portion in FIG. 10.

The radio communication system according to the second embodiment has the following effects in addition to the same effects as those of the first embodiment.

More specifically, multiplexing using a spreading code, and multiple channels in the radio communication system can be obtained. By transmitting/receiving a spread signal in a wider band, the distance and bit rate can be increased. Since the direct spread spectrum process is executed, the same effects (e.g., multipath resistance) as those of spread spectrum communication can be attained.

Third Embodiment

A radio communication system according to the third embodiment is almost the same as the radio communication system according to the second embodiment. The radio communication system according to the third embodiment is characterized by performing a spread spectrum process using a spreading code not containing any DC component. The third embodiment will be explained, and a description of a part common to the second embodiment will be omitted.

In the third embodiment, a spreading code generator 31 generates a spreading code not containing any DC component, and supplies the spreading code to a multiplier 32. For example, the spreading code generator 31 first generates a spreading code for a unipolar NRZ signal, encodes the spreading code by using a code not containing any DC component, and supplies the encoded spreading code to the multiplier 32. However, the present invention is not limited to these procedures as far as a spreading code not containing any DC component can be generated.

The power spectrum of the spreading code for the unipolar NRZ signal peaks around DC, whereas that of a spreading code encoded using, e.g., a Manchester code peaks in the AC component. For example, when a spreading code having a chip rate of 150 MHz is encoded by a Manchester code, the main lobe of the power spectrum falls almost within a range of DC to 300 MHz, and the power spectrum is mainly an AC signal component of a relatively high frequency. A transmission signal having the peak of the power spectrum in the AC signal component can be obtained using a spreading code encoded by the Manchester code as a new spreading code. Thus, the radio communication system according to the third embodiment has the following effects in addition to the same effects as those of the second embodiment. That is, a signal processed by the radio communication system is mainly an AC signal, and can be transmitted/received more efficiently than in the use of a unipolar NRZ spreading code, implementing a high-efficiency, low-power-consumption system.

Similar to the first embodiment, the third embodiment does not always require the power amplifier 33. Even when the power amplifier 33 is necessary, a power amplifier which amplifies the signal amplitude of a digital signal without converting the digital signal is employed, similar to the first embodiment. The transmitter does not require any analog circuit, and a simple transmitter design and low cost can be achieved. In any case, a rectangular digital signal to be transmitted is supplied to a transmission antenna 34 in the third embodiment, similar to the first embodiment.

Fourth Embodiment

In a radio communication system according to the fourth embodiment, the transmitting side performs a spread spectrum process by multiplying a digital signal to be transmitted by a spreading code, and generates and transmits an impulse-like rectangular signal in response to the rise and fall of the spread signal having undergone the spread spectrum process. The receiving side performs despreading corresponding to the spread spectrum process for the received signal, detects the peak of the despread signal, and restores the digital signal. In this fashion, the fourth embodiment transmits/receives a digital signal without using any carrier. The fourth embodiment will be explained with reference to the accompanying drawings.

Figure 11:
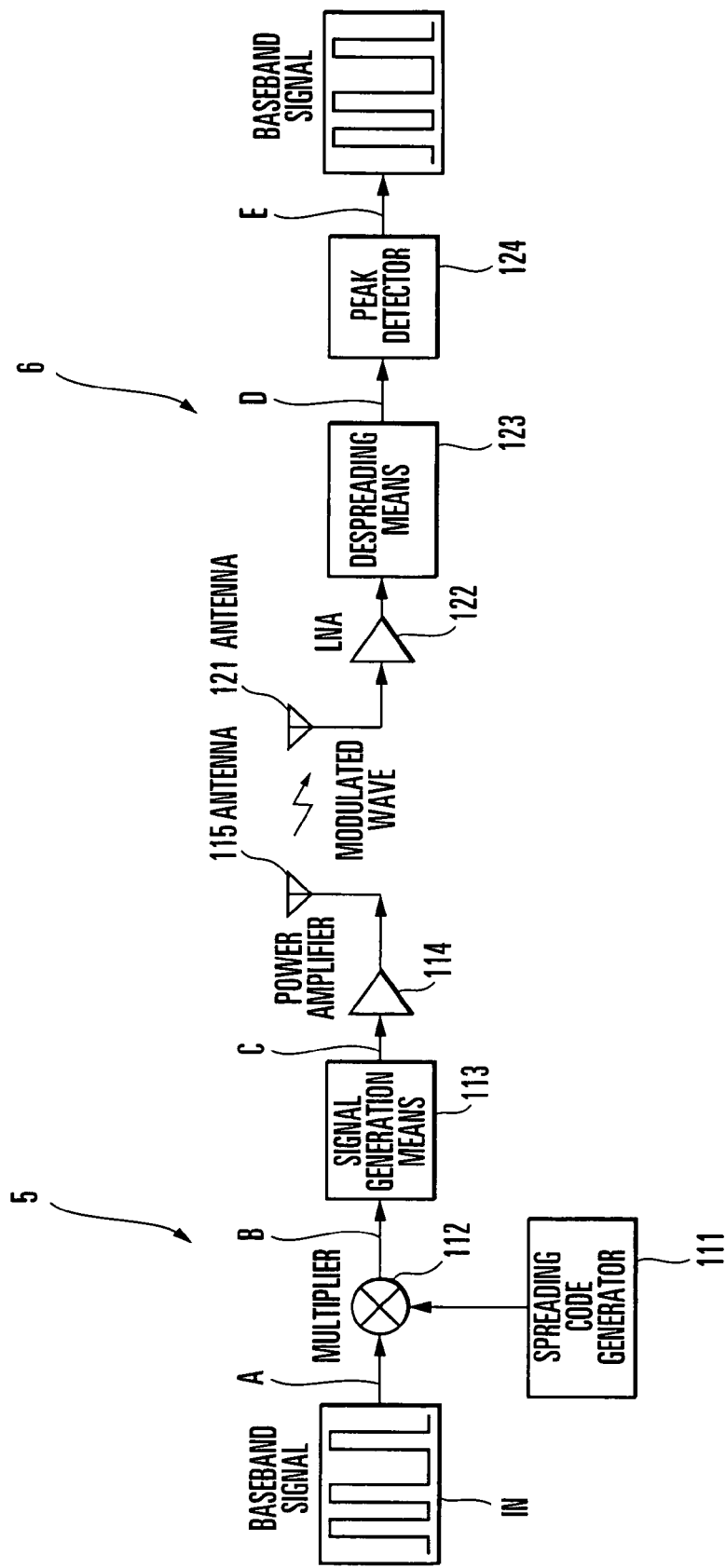
FIG. 11 is a block diagram showing the configuration of a radio communication system according to the fourth embodiment of the present invention.

FIG. 11 is a block diagram showing the configuration of the radio communication system according to the fourth embodiment of the present invention. In FIG. 11, the radio communication system is formed from a radio transmitter 5 and radio receiver 6. The radio transmitter 5 comprises a spreading code generator 111, multiplier 112, signal generation means 113, power amplifier 114, and transmission antenna 115. The radio receiver 6 comprises a reception antenna 121, low-noise amplifier (LNA) 122, despreading means 123, and peak detector 124. In the fourth embodiment, the spreading code generator 111, multiplier 112, and signal generation means 113 form an encoder, whereas the despreading means 123 and peak detector 124 form a decoder.

The operation of the radio communication system will be explained together with the flow of a signal. In FIG. 11, a digital signal (baseband signal) IN to be transmitted is input to the multiplier 112. The spreading code generator 111 generates a spreading code. The multiplier 112 performs a direct spread spectrum process for the digital signal IN by multiplying the input digital signal IN by the spreading code. That is, the spreading code generator 111 and multiplier 112 function as a spreading means for performing a spread spectrum process by multiplying a digital signal IN to be transmitted by a spreading code. The direct spread spectrum process spreads the digital signal IN in a wide band.

The spread signal output from the multiplier 112 is supplied to the signal generation means 113. The signal generation means 113 generates an impulse-like rectangular signal in response to the rise and fall of the spread signal. As the signal generation means 113, a differentiator, high-pass filter, bandpass filter, and the like are available. When the high-pass filter or bandpass filter is used, a passive element may be used, or the result of differential operation by a signal process using a digital filter may be output. In any case, the signal generation means 113 is not particularly limited to them as far as the signal generation means 113 has a function of generating an impulse-like rectangular signal in response to the rise and fall of the spread signal.

FIG. 12 shows examples of the signal waveform output from the signal generation means 113. A signal waveform shown in FIG. 12A is the waveform of a spread signal input to the signal generation means 113. Signal waves shown in FIGS. 12B and 12C are the waveforms of signals output from the signal generation means 113. The signal generation means 113 outputs a rectangular signal corresponding to the rise and fall of the spread signal. FIG. 12D shows the frequency spectrum of a spread signal input to the signal generation means 113, and FIG. 12E shows that of a rectangular signal output from the signal generation means 113. Since a rectangular signal narrower in signal width than the spread signal is output from the signal generation means 113, the distribution of the main lobe of the frequency spectrum of the rectangular signal greatly extends to the high frequency side as shown in FIG. 12E, compared to the frequency spectrum of the spread signal shown in FIG. 12D. From this, when the chip rate of a spread signal to be transmitted is not so high, a rectangular signal corresponding to the rise and fall of the spread signal is generated using the signal generation means 113, as shown in FIG. 12. The signal power can be spread to the high frequency side and more efficiently transmitted.

The power amplifier 114 amplifies a rectangular signal output from the signal generation means 113, and the transmission antenna 115 transmits by radio the signal amplified by the power amplifier 114.

Similar to the first embodiment, the fourth embodiment does not always require the power amplifier 114. Even when the power amplifier 114 is necessary, a power amplifier which amplifies the signal amplitude of a digital signal without converting the digital signal is employed, similar to the first embodiment. The transmitter does not require any analog circuit, and a simple transmitter design and low cost can be achieved. In any case, a rectangular digital signal to be transmitted is supplied to transmission antenna 115 in the fourth embodiment, similar to the first embodiment.

FIGS. 13 and 14 show representative signal waveforms at point A (input of the multiplier 112), point B (output of the multiplier 112), and point C (output of the signal generation means 113) in the radio transmitter 5 of FIG. 11. FIG. 14 enlarges and illustrates a portion P3 of the signal waveform in FIG. 13. The ordinate in FIGS. 13 and 14 represents the signal strength, and the abscissa represents the time. FIGS. 13 and 14 show signal waveforms when the digital signal IN is spread at a chip rate 100 times higher than that of the digital signal IN by using a PN31 spreading code and a differentiator is used as the signal generation means 113.

Figures 13A, 13B, 13C:
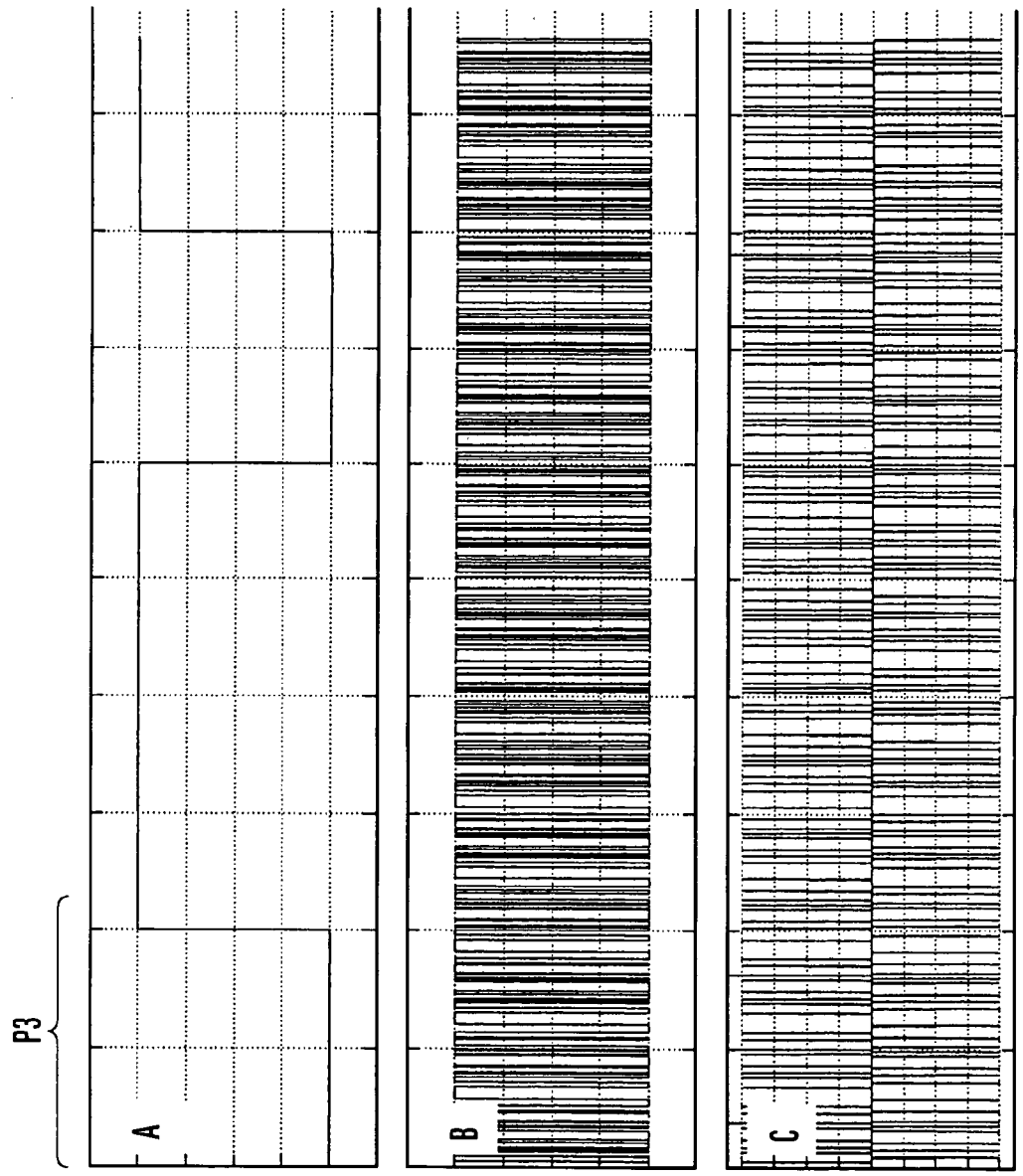
FIG. 13A is a signal waveform chart showing a baseband signal in a radio transmitter according to the fourth embodiment of the present invention.
FIG. 13B is a signal waveform chart showing a spread signal in the radio transmitter.
FIG. 13C is a signal waveform chart showing an impulse signal in the radio transmitter.
Figures 14A, 14B, 14C:
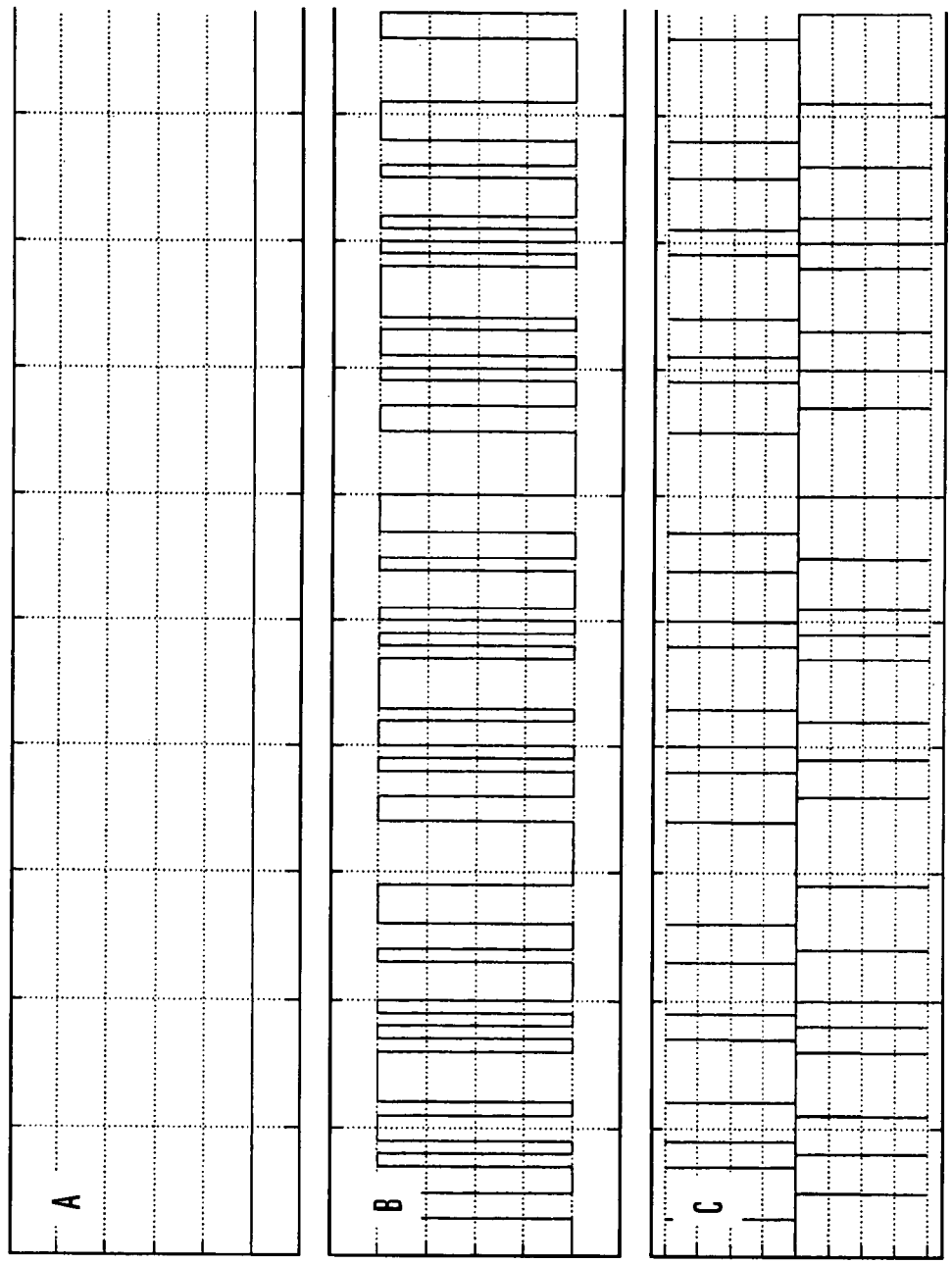
FIG. 14A is an enlarged signal waveform chart of FIG. 13A.
FIG. 14B is an enlarged signal waveform chart of FIG. 13B.
FIG. 14C is an enlarged signal waveform chart of FIG. 13C.

A signal shown in FIGS. 13A and 14A is a digital signal IN to be transmitted. A signal shown in FIGS. 13B and 14B is a spread signal after the digital signal IN is spread by a spreading code. A signal shown in FIGS. 13C and 14C is an impulse-like pulse signal after the spread signal is differentiated. FIG. 14C reveals that an impulse-like rectangular signal is obtained at point C in response to the rise and fall of the spread signal at point B.

In this fashion, an impulse-like pulse signal corresponding to the rise and fall of the spread signal at point B is attained, and the differentiator functions as the signal generation means 113.

As described above, the radio transmitter 5 of the fourth embodiment transmits a rectangular signal corresponding to the rise and fall of a spread signal to be transmitted without using any carrier, particularly any analog high-frequency carrier. The radio transmitter 5 does not require a circuit for generating a carrier and a circuit for modulating/demodulating a carrier, such as a voltage controlled oscillator (VCO) and multiplier.

The radio receiver 6 will be explained. A signal transmitted from the transmission antenna 115 is received by the reception antenna 121, amplified by the LNA 122, and supplied to the despreading means 123.

The despreading means 123 executes despreading corresponding to a spread spectrum process by the radio transmitter 5 for an impulse signal output from the LNA 122, and supplies the despread signal to the peak detector 124. Despreading includes a synchronous method of performing despreading in synchronism with the code phase of a signal input to the despreading means 123, and an asynchronous method of performing despreading without establishing synchronization with the code phase. The fourth embodiment employs a synchronous despreading means 123. The synchronous despreading means generally utilizes various delay-locked loops (DLLs), but the despreading means 123 not particularly limited to them.

The peak detector 124 detects the peak of a signal output from the despreading means 123, and restores a digital signal (baseband signal).

Figures 15A, 15B:
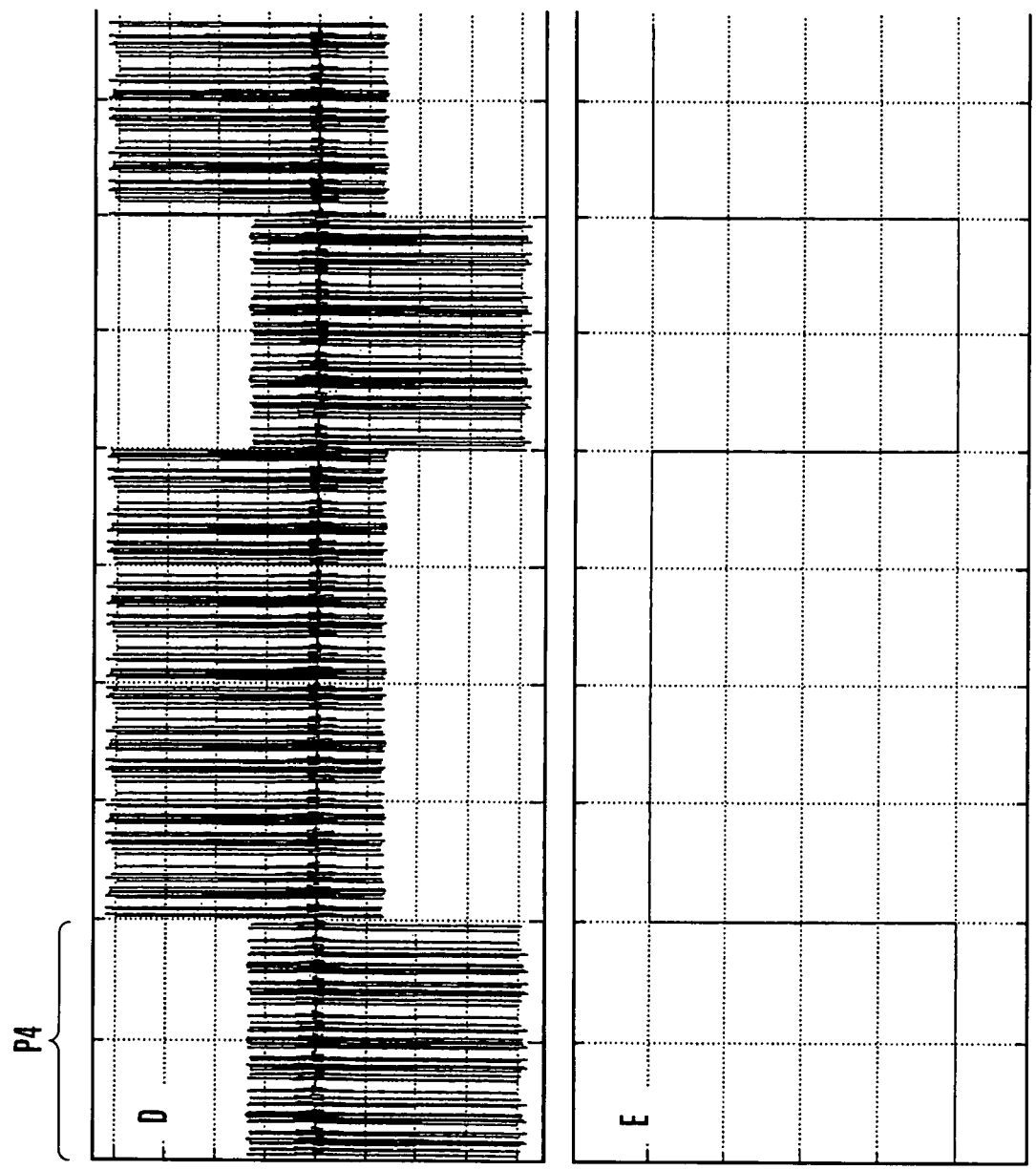
FIG. 15A is a signal waveform chart showing a despread signal in a radio receiver according to the fourth embodiment of the present invention.
FIG. 15B is a signal waveform chart showing a baseband signal in the radio receiver.
Figure 16A:
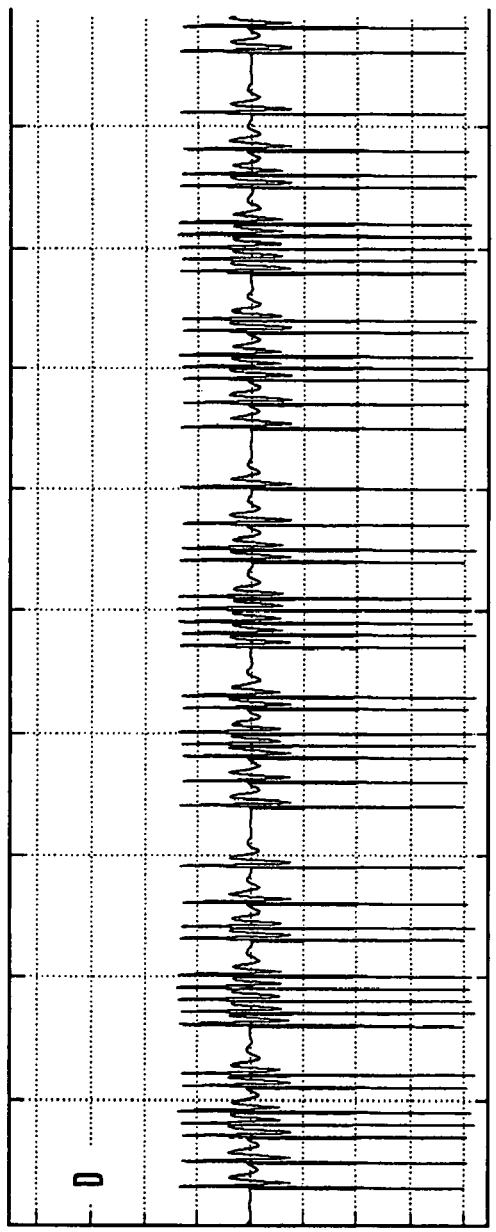
FIG. 16A is an enlarged signal waveform chart of FIG. 15A.
Figure 16B:
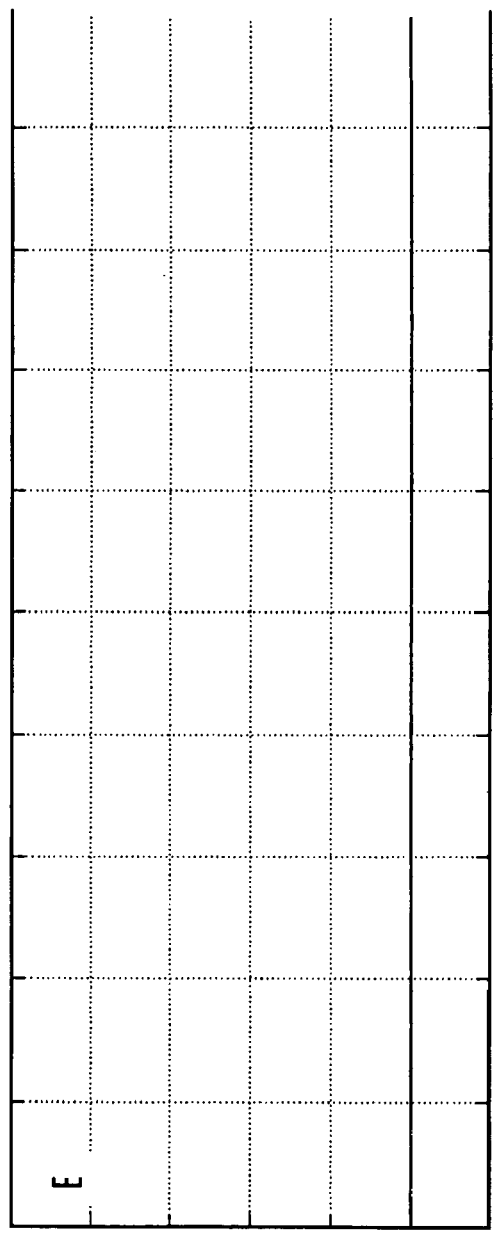
FIG. 16B is an enlarged signal waveform chart of FIG. 15B.

FIGS. 15 and 16 show representative signal waveforms at point D (output of the despreading means 123) and point E (output of the peak detector 124) in the radio receiver 6 of FIG. 11. FIG. 16 enlarges and illustrates a portion P4 of the signal waveform in FIG. 15. The signal at point D that is despread by the despreading means 123 is a peak signal corresponding to high/low level of a transmitted digital signal. Upon receiving the signal at point D, the peak detector 124 detects a peak, and restores the transmitted digital signal, as shown in FIGS. 15B and 16B.

As described above, the radio receiver 6 receives a digital signal transmitted without using any carrier, particularly any analog high-frequency carrier. The radio receiver 6 does not require a circuit for generating a carrier and a circuit for demodulating a carrier, such as a VCO and multiplier.

The reason why radio communication can be done without using any carrier will be explained. Radio communication can transmit only an AC component, and cannot transmit any DC component. Since it is difficult to transmit a baseband signal having the peak of the power spectrum around the DC component, a high-frequency carrier is generally modulated.

To the contrary, the radio communication system according to the fourth embodiment efficiently transmits a high-frequency signal by spreading the digital signal IN to be transmitted to a high frequency by a direct spread spectrum process, and generating an impulse-like rectangular signal from the spread signal. The direct spread spectrum process enables communication when the ratio (SI ratio) of the reception power of a desired wave after despreading to the power of an interference wave is higher than an SI ratio necessary to obtain a required reception error rate. If a necessary SI ratio is ensured, all the main lobe of the power spectrum need not be transmitted/received though an exchangeable frequency band depends on the band of an antenna for use. Communication is possible even when only the spectrum of a spread signal on a relatively high frequency side is transmitted/received, like the fourth embodiment.

More specifically, when a signal generation means for generating a rectangular signal with a signal width which is ¹/₁₀₀ the signal width of a 3-MHz spread signal is used, the power spectrum of the signal extends from DC to 300 MHz. For example, an antenna having a wide band of 100 MHz to 300 MHz can be used to transmit/receive the spectrum of the spread signal. When a 1-MHz baseband signal is spread using a spreading code with a chip rate of 300 MHz, the main lobe of the power spectrum of the spread signal extends from DC to 300 MHz. When a digital high-pass filter having a pass band of 100 MHz or more is utilized as the signal generation means 113, the main lobe of the spectrum of the spread signal having passed through the signal generation means 113 falls almost within a range of 100 MHz to 300 MHz. By using the wideband antenna, the spectrum of the spread signal can be transmitted/received. As a result, the fourth embodiment can implement radio communication using no carrier.

As described above, according to the fourth embodiment, the digital signal IN to be transmitted undergoes direct spreading to generate a rectangular signal. Pulse transmission communication becomes possible, and radio communication is done without using any carrier. Analog high-frequency circuits such as a VCO necessary to generate a carrier and a multiplier necessary for up conversion and down conversion can be eliminated. The hardware sizes of the radio transmitter 5 and radio receiver 6 which form the system can be greatly reduced, and a simple system, low cost, and low power consumption can be realized.

Further, the fourth embodiment achieves multiplexing using a spreading code, and multiple channels in the radio communication system. By transmitting/receiving a spread signal in a wider band, the distance and bit rate can be increased, and effects such as multipath resistance can be attained, similar to spread spectrum communication. Since the main process of the radio transmitter 5 is a digital signal process, the number of analog circuits can be greatly reduced, and the cost and power consumption can also be greatly reduced.

The radio communication system according to the fourth embodiment has the following effect in addition to the same effects as those of the second embodiment. That is, a high-frequency signal component can be efficiently transmitted using the signal generation means.

Fifth Embodiment

The fifth embodiment of the present invention will be described. A radio communication system according to the fifth embodiment is identical in the configuration of a radio transmitter 5 to the radio communication system according to the fourth embodiment, but is different in the configuration of a radio receiver. The fifth embodiment will be explained with reference to the accompanying drawings, and a description of a part common to the fourth embodiment will be omitted.

Figure 17:
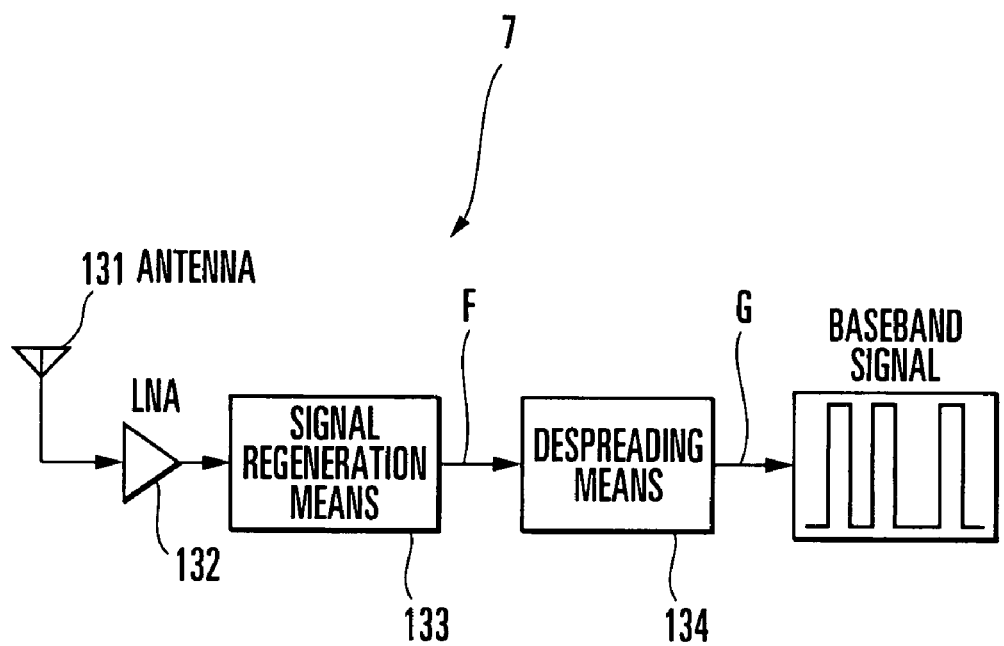
FIG. 17 is a block diagram showing the configuration of a radio receiver in a radio communication system according to the fifth embodiment of the present invention.

FIG. 17 is a block diagram showing the configuration of the radio receiver in the radio communication system according to the fifth embodiment. As described above, the radio transmitter 5 has the same configuration as that in the fourth embodiment, and is not illustrated in FIG. 17.

A radio receiver 7 according to the fifth embodiment comprises a reception antenna 131, low-noise amplifier (LNA) 132, signal regeneration means 133, and despreading means 134. In the fifth embodiment, the signal regeneration means 133 and despreading means 134 form a decoder.

A signal transmitted from the radio transmitter 5 is received by the reception antenna 131, amplified by the LNA 132, and supplied to the signal regeneration means 133. The signal regeneration means 133 detects an impulse-like pulse signal output from the LNA 132, regenerates a rectangular spread signal before a process by the signal generation means of the radio transmitter 5, and supplies the spread signal to the despreading means 134. As the signal regeneration means 133, a matched filter, an integrating circuit using an operational amplifier, a comparator, and the like are available. As for the matched filter, a passive element may be used, or the result of operation by a CCD, analog signal process, or digital signal process may be output. In any case, the signal regeneration means 133 is not particularly limited as far as it regenerates a spread signal upon reception of an impulse signal.

The despreading means 134 executes despreading corresponding to a spread spectrum process by the radio transmitter 5 for the spread signal output from the signal regeneration means 133, thus restoring a digital signal (baseband signal). Despreading includes a synchronous method of performing despreading in synchronism with the code phase of a spread signal input to the despreading means 134, and an asynchronous method of performing despreading without establishing synchronization with the code phase. The fifth embodiment employs a synchronous despreading means. The synchronous despreading means generally utilizes various delay-locked loops (DLLs), but the despreading means 134 is not particularly limited to them.

Figures 18A, 18B:
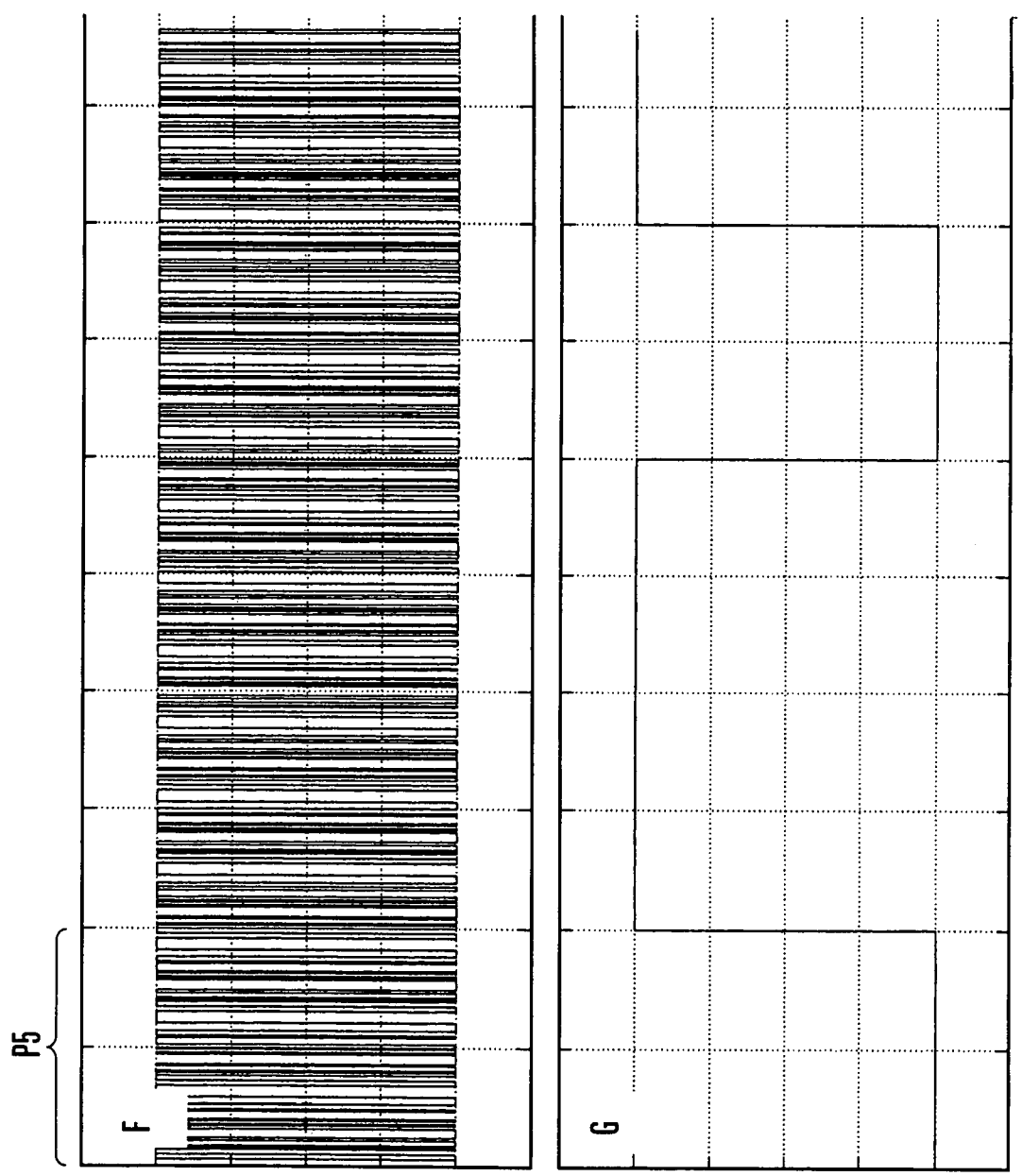
FIG. 18A is a signal waveform chart showing a regenerated spread signal in the radio receiver according to the fifth embodiment of the present invention.
FIG. 18B is a signal waveform chart showing a baseband signal in the radio receiver.
Figure 19A:
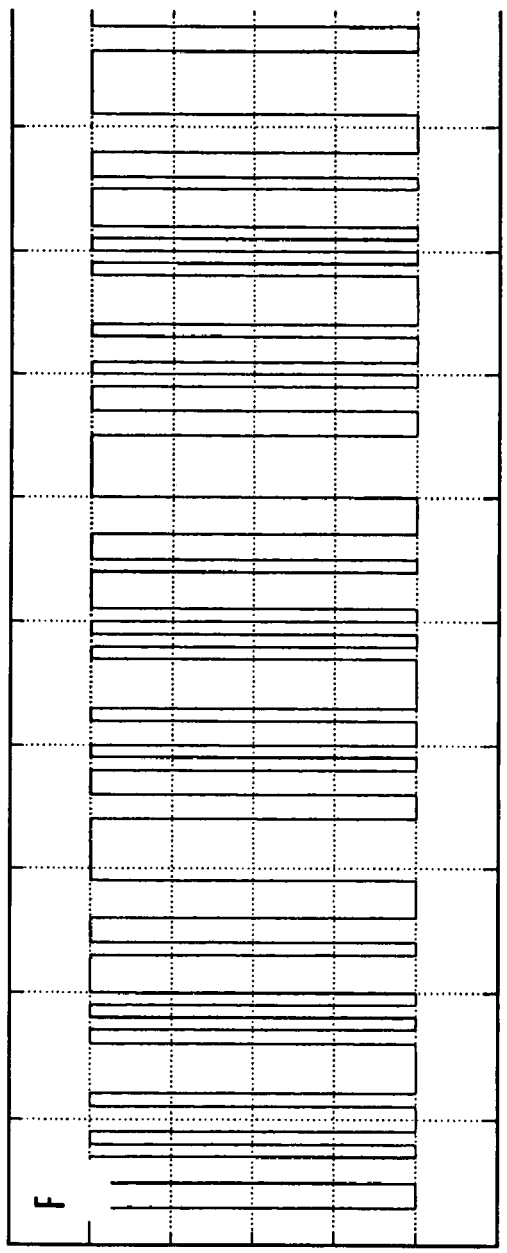
FIG. 19A is an enlarged signal waveform chart of FIG. 18A.
Figure 19B:
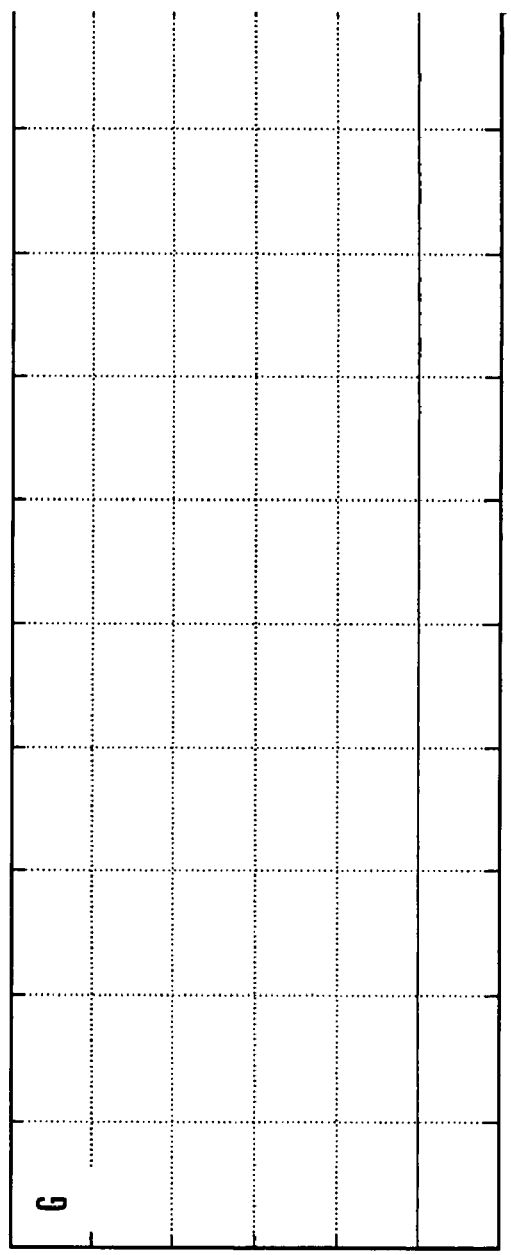
FIG. 19B is an enlarged signal waveform chart of FIG. 18B.

FIGS. 18 and 19 show representative signal waveforms at point F (output of the signal regeneration means 133) and point G (output of the despreading means 134) in the radio receiver 7 of FIG. 17. FIG. 19 enlarges and illustrates a portion P5 of the signal waveform in FIG. 18. A spread signal shown in FIGS. 18A and 19A is obtained when the signal regeneration means 133 detects an impulse-like radio signal and performs a regeneration process. A digital signal shown in FIGS. 18B and 19B is restored when the despreading means 134 receives the spread signal and performs despreading. A signal received by the reception antenna 131 can be regarded as one prepared by modulating the phase of the impulse signal, as represented at point C of FIG. 11. The signal regeneration means 133 suffices to have a function of detecting the polarity of the peak value of an impulse signal, and outputting a high- or low-level. signal.

Figure 20A:
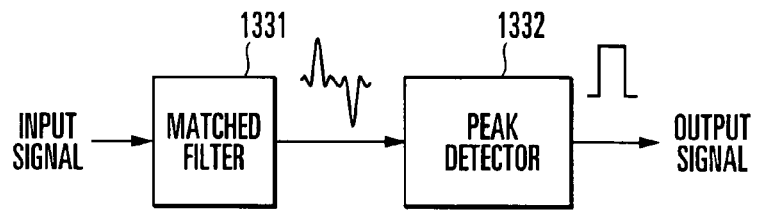
FIGS. 20A, 20B, 20C, 20D, and 20E are block diagrams showing examples of the configuration of a signal regeneration means according to the fifth embodiment of the present invention.

FIGS. 20A, 20B, 20C, 20D, and 20E show examples of the configuration of the signal regeneration means 133. The signal regeneration means 133 is formed from, e.g., a matched filter 1331 and peak detector 1332 (FIG. 20A). When the matched filter is to be used, a matched filter corresponding to the shape of an impulse signal transmitted from the radio transmitter 5 is used, and can selectively detect an impulse signal from signals received by the reception antenna 131. The peak of a signal output from the matched filter 1331 is detected by the peak detector 1332, and a rectangular spread signal can be regenerated.

Figure 20B:
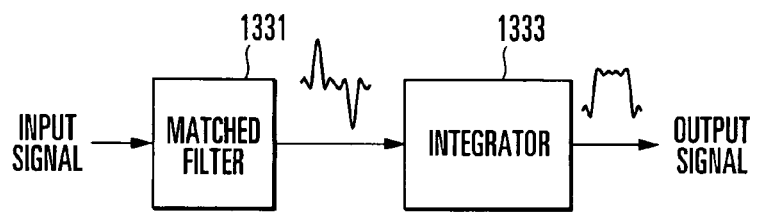

As shown in FIG. 20B, the signal regeneration means 133 can be formed from the matched filter 1331 and an integrator 1333, and regenerate a spread signal by integrating a signal output from the matched filter 1331 by the integrator 1333.

Figure 20C:
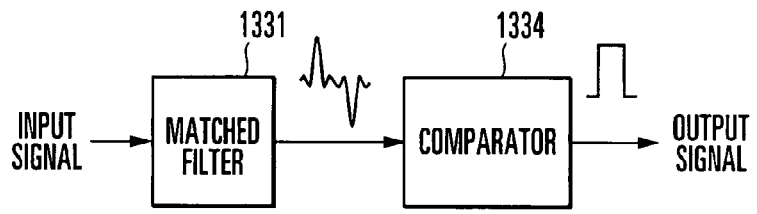

As shown in FIG. 20C, the signal regeneration means 133 can be formed from the matched filter 1331 and a comparator 1334, and regenerate a spread signal by binarizing a signal output from the matched filter 1331 by the comparator 1334.

Figure 20D:
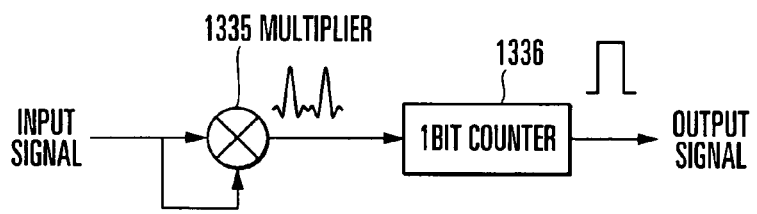

As shown in FIG. 20D, the signal regeneration means 133 can be formed from a multiplier 1335 and 1-bit counter 1336, and regenerate a spread signal by detecting the envelope of a signal output from the LNA 132 by the multiplier 1335 and counting the envelope-detected signal by the 1-bit counter 1336. In envelope detection by square-law detection of the multiplier 1335, a pulse is generated in response to the rise and fall of a signal output from the LNA 132. Since the rise and fall always alternately appear in a signal output from the LNA 132, a spread signal can be restored by fixing the interval between envelope-detected pulses to high or low level. The 1-bit counter 1336 outputs a high- or low-level signal every time the multiplier 1335 outputs a pulse.

Figure 20E:
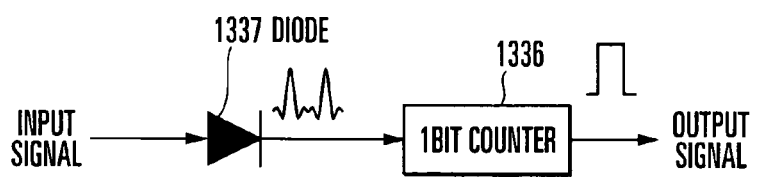

As shown in FIG. 20E, the signal regeneration means 133 can be formed from a diode 1337 and the 1-bit counter 1336, and regenerate a spread signal by detecting the envelope of a signal output from the LNA 132 by the diode 1337 and counting the envelope-detected signal by the 1-bit counter 1336. In any case, the signal regeneration means 133 is not limited to these configurations as far as it has the same function.

As described above, the radio receiver 7 according to the fifth embodiment receives a digital signal transmitted without using any carrier, particularly any analog high-frequency carrier, similar to the fourth embodiment. The radio receiver 7 does not require a circuit for generating a carrier and a circuit for demodulating a carrier, such as a VCO and multiplier.

The fifth embodiment has the same effects as those of the fourth embodiment. Moreover, the fifth embodiment facilitates despreading demodulation in comparison with direct despreading of an impulse signal because a rectangular spread signal is regenerated from a transmitted impulse signal and despread.

Because of a process gain by despreading demodulation, a spread signal output from the signal regeneration means 133 may slightly contain an error, or the spread signal may not be a perfectly rectangular signal, which does not inhibit communication.

Sixth Embodiment

The sixth embodiment of the present invention will be described. A radio communication system according to the sixth embodiment is identical in the configuration of a radio transmitter 5 to the radio communication system according to the fourth embodiment, but is different in the configuration of a radio receiver. The sixth embodiment will be explained with reference to the accompanying drawings, and a description of a part common to the fourth embodiment will be omitted.

Figure 21:
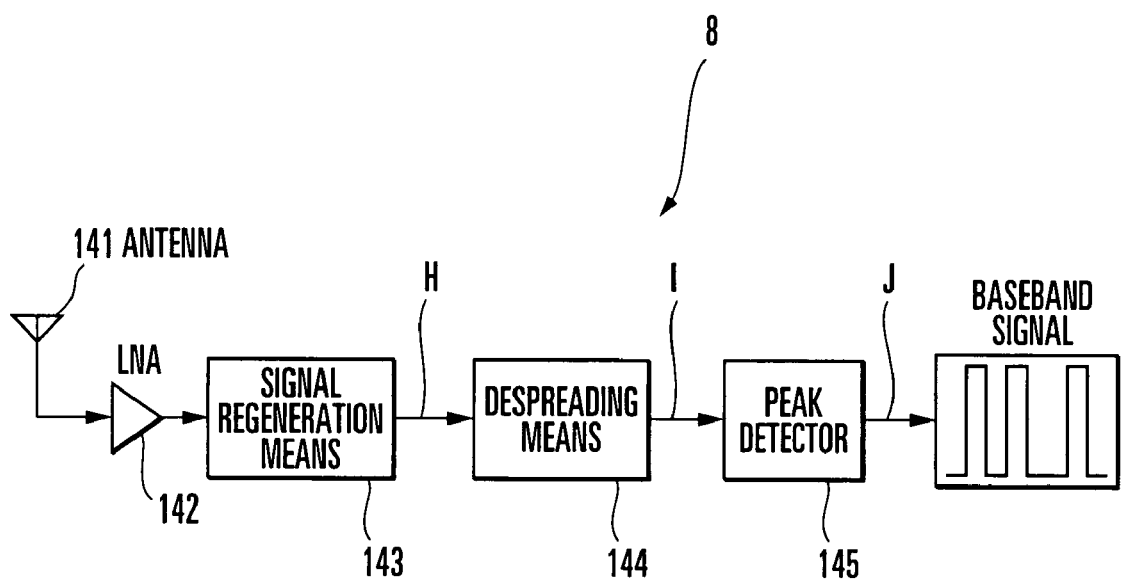
FIG. 21 is a block diagram showing the configuration of a radio receiver in a radio communication system according to the sixth embodiment of the present invention.

FIG. 21 is a block diagram showing the configuration of the radio receiver in the radio communication system according to the sixth embodiment. As described above, the radio transmitter 5 has the same configuration as that in the fourth embodiment, and is not illustrated in FIG. 21.

A radio receiver 8 according to the sixth embodiment comprises a reception antenna 141, low-noise amplifier (LNA) 142, signal regeneration means 143, despreading means 144, and peak detector 145. In the sixth embodiment, the signal regeneration means 143, despreading means 144, and peak detector 145 form a decoder.

A signal transmitted from the radio transmitter 5 is received by the reception antenna 141, amplified by the LNA 142, and supplied to the signal regeneration means 143.

Similar to the signal regeneration means 133 of the fifth embodiment, the signal regeneration means 143 regenerates a rectangular spread signal before a process by the signal generation means of the radio transmitter 5 from a signal output from the LNA 142, and supplies the spread signal to the despreading means 144.

The despreading means 144 executes despreading corresponding to a spread spectrum process by the radio transmitter 5 for the spread signal output from the signal regeneration means 143, and supplies the despread signal to the peak detector 145. Despreading includes a synchronous method of performing despreading in synchronism with the code phase of a spread signal input to the despreading means 144, and an asynchronous method of performing despreading without establishing synchronization with the code phase. The sixth embodiment employs an asynchronous despreading means. As the asynchronous despreading means, a passive element such as a matched filter by a SAW device may be used, a matched filter using a CCD, analog signal process, or digital signal process may be used, or the configuration shown in FIG. 5 may be used. However, the despreading means 144 is not particularly limited to them as far as it can perform asynchronous despreading decoding.

The peak detector 145 detects the peak of a signal output from the despreading means 144, and restores a digital signal (baseband signal).

Figures 22A, 22B, 22C:
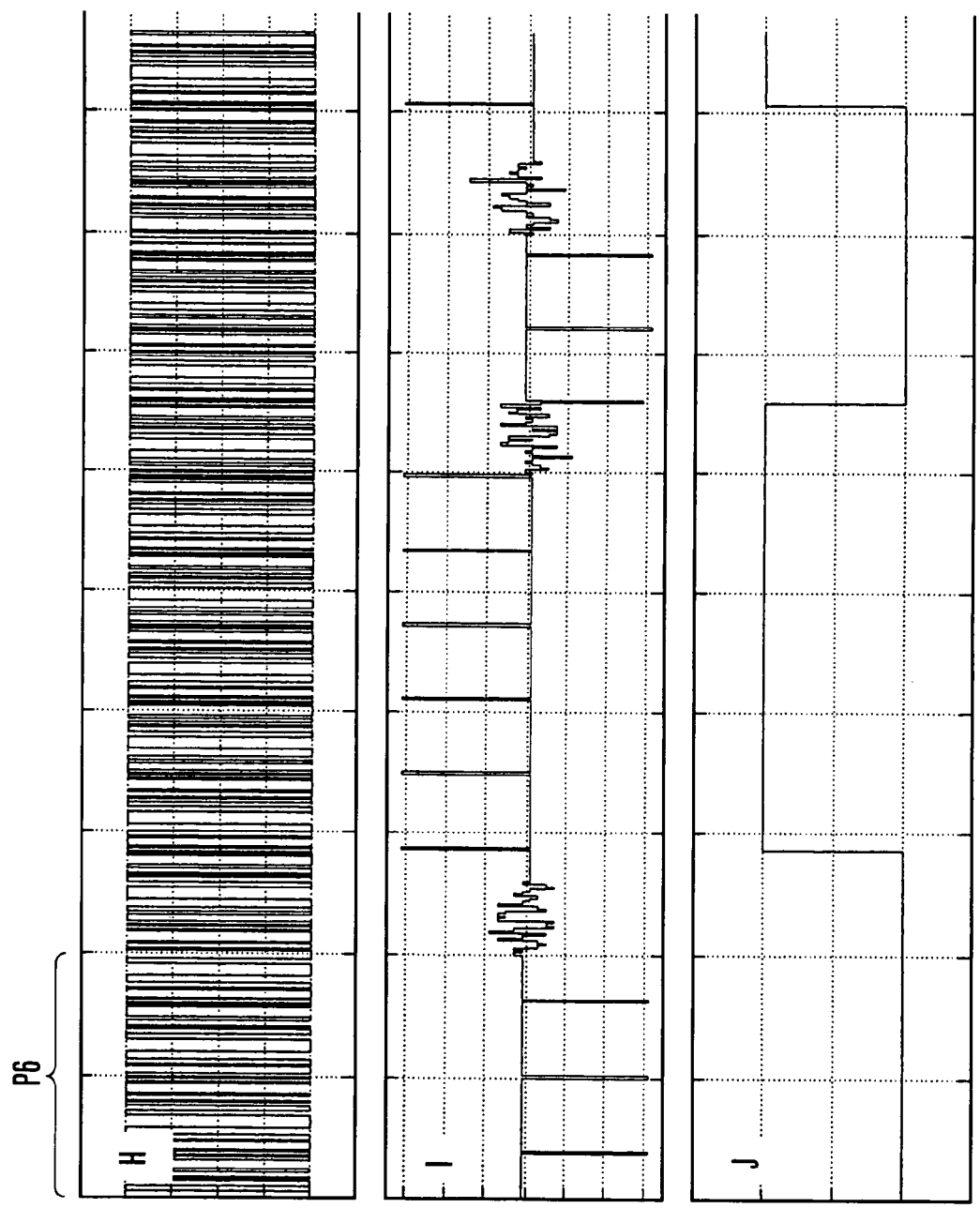
FIG. 22A is a signal waveform chart showing a regenerated spread signal in the radio receiver according to the sixth embodiment of the present invention.
FIG. 22B is a signal waveform chart showing a despread signal in the radio receiver.
FIG. 22C is a signal waveform chart showing a baseband signal.
Figure 23A:
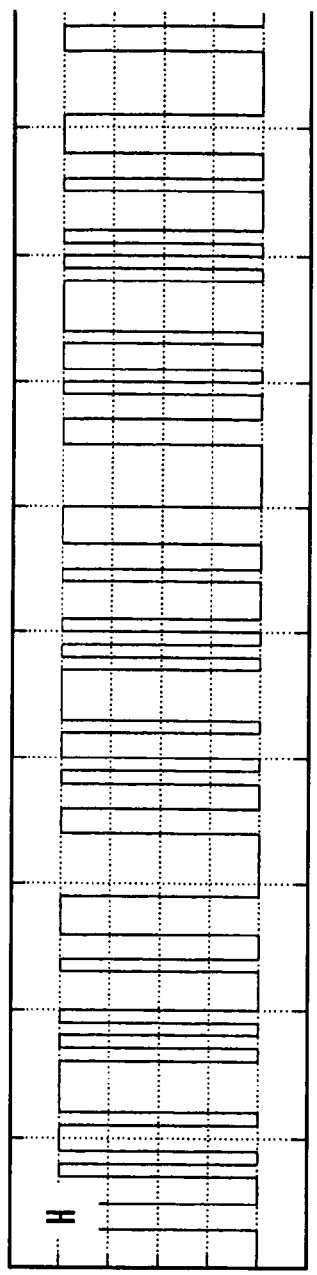
FIG. 23A is an enlarged signal waveform chart of FIG. 22A.
Figure 23B:
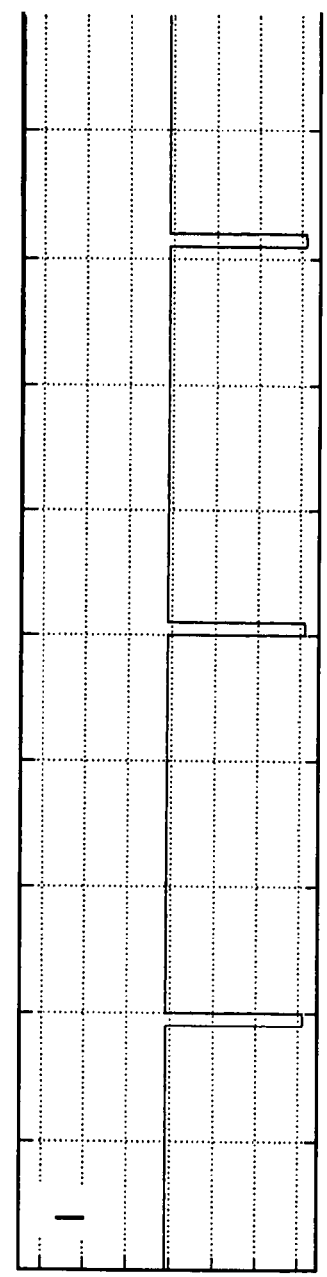
FIG. 23B is an enlarged signal waveform chart of FIG. 22B.
Figure 23C:
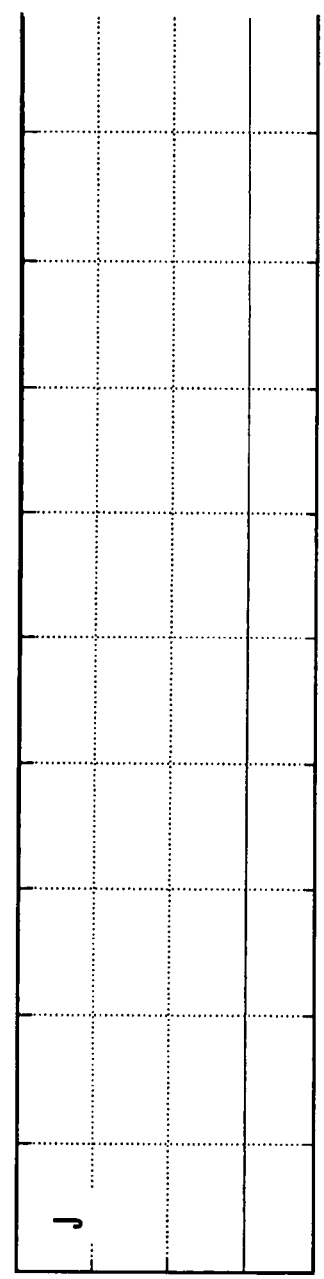
FIG. 23C is an enlarged signal waveform chart of FIG. 22C.

FIGS. 22 and 23 show representative signal waveforms at point H (output of the signal regeneration means 143), point I (output of the despreading means 144), and point J (output of the peak detector 145) in the radio receiver 8 of FIG. 21. FIG. 23 enlarges and illustrates a portion P6 of the signal waveform in FIG. 22. A spread signal shown in FIGS. 22A and 23A is obtained when the signal regeneration means 143 detects an impulse-like radio signal and performs a regeneration process. As shown in FIGS. 22B and 23B, part of a digital signal is regenerated when the asynchronous despreading means 144 receives the spread signal and performs despreading. The peak detector 145 receives the despread signal, detects the peak, and restores a digital signal shown in FIGS. 22C and 23C.

As described above, the radio receiver 8 according to the sixth embodiment receives a digital signal transmitted without using any carrier, particularly any analog high-frequency carrier, similar to the fourth embodiment. Hence, the radio receiver 8 does not require a circuit for generating a carrier and a circuit for demodulating a carrier, such as a VCO and multiplier.

The sixth embodiment has the same effects as those of the fifth embodiment. In addition, the sixth embodiment can reduce the hardware size in comparison with a synchronous despreading means and can decrease the power consumption because despreading is asynchronously performed.

Seventh Embodiment

The seventh embodiment of the present invention will be described. A radio communication system according to the seventh embodiment is identical in the configuration of a radio transmitter 5 to the radio communication system according to the fourth embodiment, but is different in the configuration of a radio receiver. The seventh embodiment will be explained with reference to the accompanying drawings, and a description of a part common to the fourth embodiment will be omitted.

Figure 24:
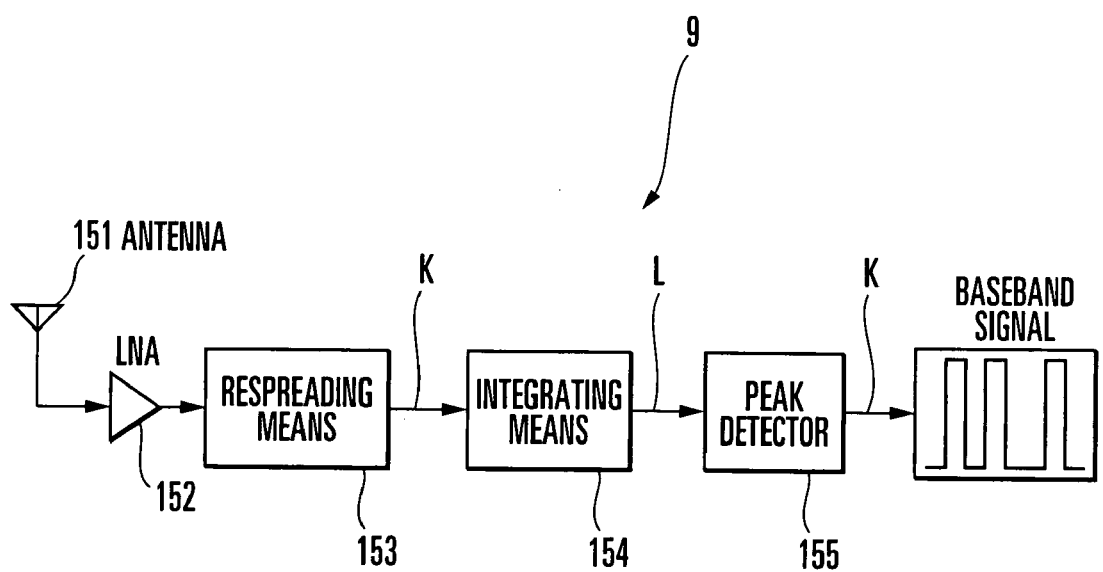
FIG. 24 is a block diagram showing the configuration of a radio receiver in a radio communication system according to the seventh embodiment of the present invention.

FIG. 24 is a block diagram showing the configuration of the radio receiver in the radio communication system according to the seventh embodiment. As described above, the radio transmitter 5 has the same configuration as that in the fourth embodiment, and is not illustrated in FIG. 24.

A radio receiver 9 according to the seventh embodiment comprises a reception antenna 151, low-noise amplifier (LNA) 152, despreading means 153, integrating means 154, and peak detector 155. In the seventh embodiment, the despreading means 153, integrating means 154, and peak detector 155 form a decoder.

A signal transmitted from the radio transmitter 5 is received by the reception antenna 151, amplified by the LNA 152, and supplied to the despreading means 153.

The despreading means 153 executes despreading corresponding to a spread spectrum process by the radio transmitter 5 for the signal output from the LNA 152, and supplies the despread signal to the integrating means 154. Despreading includes a synchronous method of performing despreading in synchronism with the code phase of a spread signal input to the despreading means 153, and an asynchronous method of performing despreading without establishing synchronization with the code phase. The seventh embodiment employs an asynchronous despreading means. As the asynchronous despreading means, a passive element such as a matched filter by a SAW device may be used, a matched filter using a CCD, analog signal process, or digital signal process may be used, or the configuration shown in FIG. 5 may be used. However, the despreading means 153 is not particularly limited to them as far as it can perform asynchronous despreading decoding.

The integrating means 154 integrates the signal despread by the despreading means 153, and supplies the integrated signal to the peak detector 155. As the integrating means 154, a matched filter may be used, integral operation using an operational amplifier may be used, or a comparator circuit may be used. As for the matched filter, a passive element may be used, or the result of integral operation by a CCD, analog signal process, or digital signal process may be output. However, the integrating means 154 is not particularly limited to them.

The peak detector 155 detects the peak of a signal output from the integrating means 154, and restores a digital signal (baseband signal).

Figures 25A, 25B, 25C:
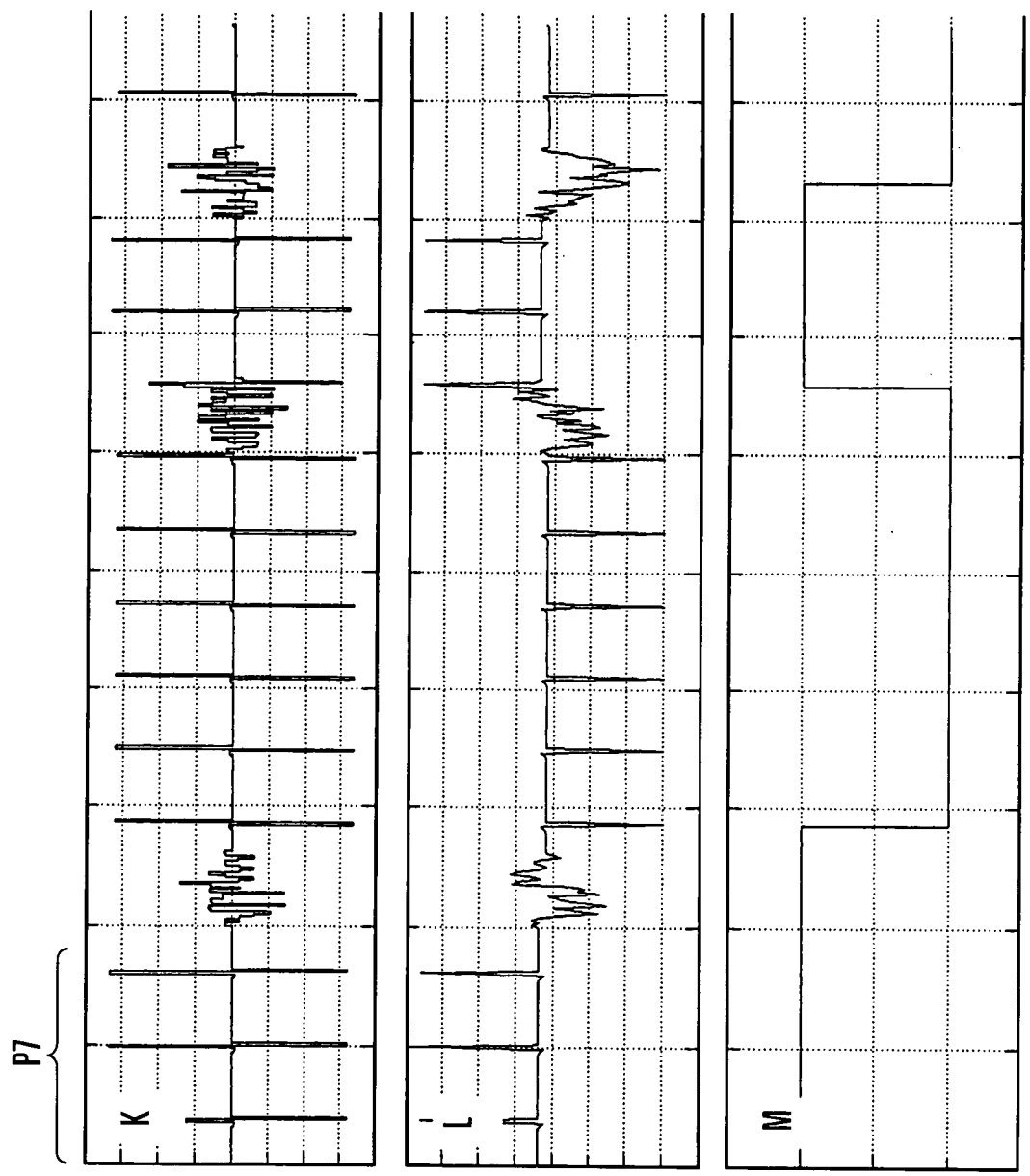
FIG. 25A is a signal waveform chart showing a despread signal in the radio receiver according to the seventh embodiment of the present invention.
FIG. 25B is a signal waveform chart showing an impulse signal in the radio receiver.
FIG. 25C is a signal waveform chart showing the signal waveform of a baseband signal in the radio receiver.
Figures 26A, 26B, 26C:
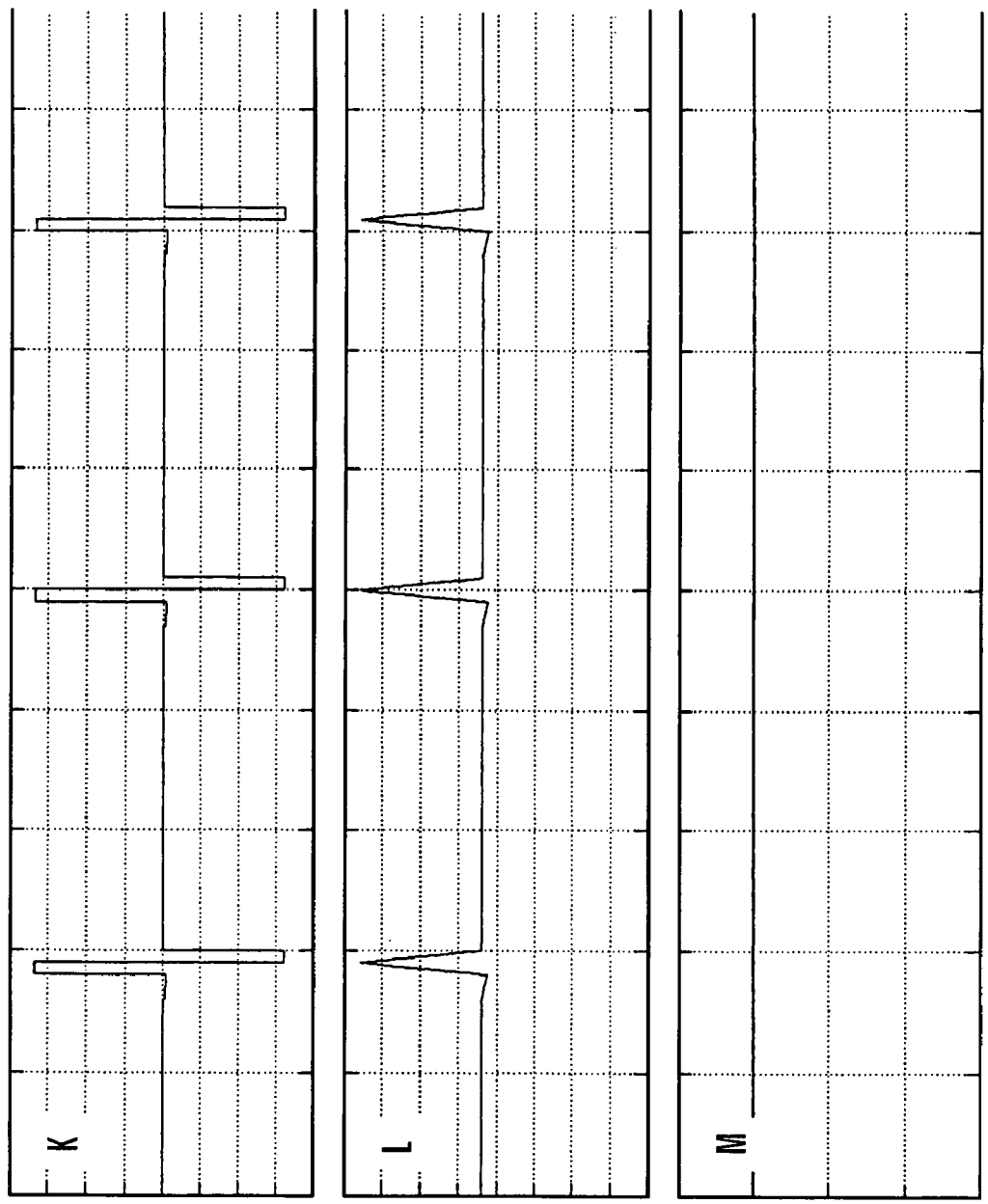
FIG. 26A is an enlarged signal waveform chart of FIG. 25A.
FIG. 26B is an enlarged signal waveform chart of FIG. 25B.
FIG. 26C is an enlarged signal waveform chart of FIG. 25C.

FIGS. 25 and 26 show representative signal waveforms at point K (output of the despreading means 153), point L (output of the integrating means 154), and point M (output of the peak detector 155) in the radio receiver 9 of FIG. 24. FIG. 26 enlarges and illustrates a portion P7 of the signal waveform in FIG. 25. The asynchronous despreading means 153 performs despreading for an impulse-like radio signal. The despreading means 153 modulates the phase of the impulse signal as shown in FIGS. 25A and 26A in accordance with high/low level of a transmitted digital signal, and outputs the phase-modulated signal. The integrating means 154 detects the phase of the impulse signal, and outputs a peak signal corresponding to the detected phase, as shown in FIGS. 25B and 26B. The peak detector 155 detects the peak signal, and restores a digital signal shown in FIGS. 25C and 26C on the basis of the detected peak.

As described above, the radio receiver 9 according to the seventh embodiment receives a digital signal transmitted without using any carrier, particularly any analog high-frequency carrier, similar to the fourth embodiment. The radio receiver 9 does not require a circuit for generating a carrier and a circuit for demodulating a carrier, such as a VCO and multiplier.

The seventh embodiment has the same effects as those of the sixth embodiment.

Eighth Embodiment

The eighth embodiment of the present invention will be described. A radio communication system according to the eighth embodiment is identical in the configuration of a radio transmitter 5 to the radio communication system according to the fourth embodiment, but is different in the configuration of a radio receiver. The eighth embodiment will be explained with reference to the accompanying drawings, and a description of a part common to the fourth embodiment will be omitted.

Figure 27:
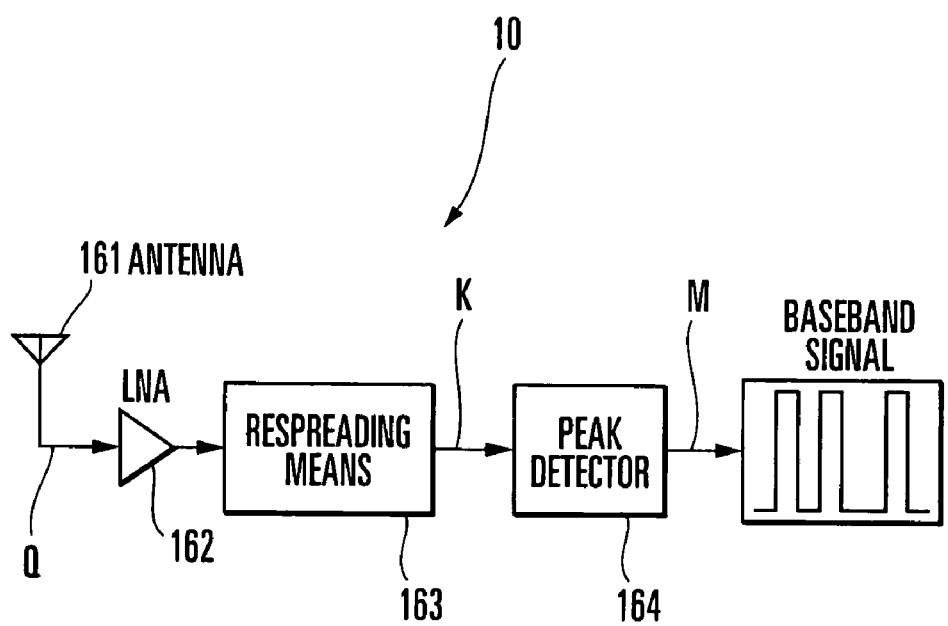
FIG. 27 is a block diagram showing the configuration of a radio receiver in a radio communication system according to the eighth embodiment of the present invention.

FIG. 27 is a block diagram showing the configuration of the radio receiver in the radio communication system according to the eighth embodiment. As described above, the radio transmitter 5 has the same configuration as that in the fourth embodiment, and is not illustrated in FIG. 27.

A radio receiver 10 according to the eighth embodiment comprises a reception antenna 161, low-noise amplifier (LNA) 162, despreading means 163, and peak detector 164. In the eighth embodiment, the despreading means 163 and peak detector 164 form a decoder.

When a spread signal is directly transmitted from a transmission antenna, or a signal corresponding to the rise and fall of the spread signal is generated and then transmitted from the antenna, the high-frequency component of the spread signal is transmitted from the transmission antenna. At this time, the transmitted signal is received by the radio receiver 9 according to the seventh embodiment and subjected to despreading to obtain a signal as shown in FIGS. 25A and 26B. As the influence by propagation of no DC component, positive and negative peaks appear using a given value as a center regardless of high/low level of the transmission signal. Since the phase of a signal output from the despreading means 153 is inverted in accordance with high/low level of transmission data, as described in the seventh embodiment, communication can be done by determining the phase of the output signal.

The seventh embodiment requires the integrating means 154 for determining the phase of a despread signal. The width of a peak signal output from the despreading means 153 narrows as the chip rate of the spread signal increases. Therefore, it becomes difficult to determine the phase of the signal shown in FIGS. 25A and 26A as the chip rate increases.

The eighth embodiment solves the problem of the seventh embodiment by executing given conversion for a spreading code sequence in a despreading process. Conversion for the spreading code sequence will be explained.

Letting S be the spread signal, C be the spreading code, and P be the correlation value between the spread signal S and the spreading code C, the correlation value P is given by $$P = C_1 \cdot S_1 + C_2 \cdot S_2 + \ldots + C_{31} \cdot S_{31} \quad (1)$$

$$= C_1 \cdot \sum_{i=-\infty}^{1} \Delta S_i + C_1 \cdot \sum_{i=-\infty}^{2} \Delta S_i + \ldots + C_{31} \cdot \sum_{i=-\infty}^{31} \Delta S_i$$

$$= (C_1 + C_2 + \ldots + C_{31}) \cdot \sum_{i=-\infty}^{0} \Delta S_i +$$

$$(C_1 + C_2 + \ldots + C_{31}) \cdot \Delta S_1 +$$

$$(C_2 + \ldots + C_{31}) \cdot \Delta S_2 + \ldots + (C_{31}) \cdot \Delta S_{31}$$

$$= \sum_k C_k \cdot S_0 + \sum_{k=1}^{31} \left( \Delta S_k \cdot \sum_{r=k}^{31} C_r \right)$$

Operation of communicating the high-frequency of the spread signal S by radio equals radio communication of a signal prepared by performing differential operation (differential modulation) for the spread signal S. In equation (1), the length of the spreading code C is 31, and ΔS is a signal prepared by performing differential operation (differential modulation) for the spread signal S.

Since $$\sum_k C_k$$

is almost 0 from the nature of the spreading code C, the correlation value P is substantially $$P \approx \sum_{k=1}^{31} \left( \Delta S_k \cdot \sum_{r=k}^{31} C_r \right) \quad (2)$$

In general, a length M of the spreading code C is given by $$P \approx \sum_{k=1}^{M} \left( \Delta S_k \cdot \sum_{r=k}^{M} C_r \right) \quad (3)$$

That is, a correlation value peak signal can be obtained by correlation value operation for the high-frequency component ΔS of the spread signal by using the spreading code C which satisfies equation (3).

Figure 28:
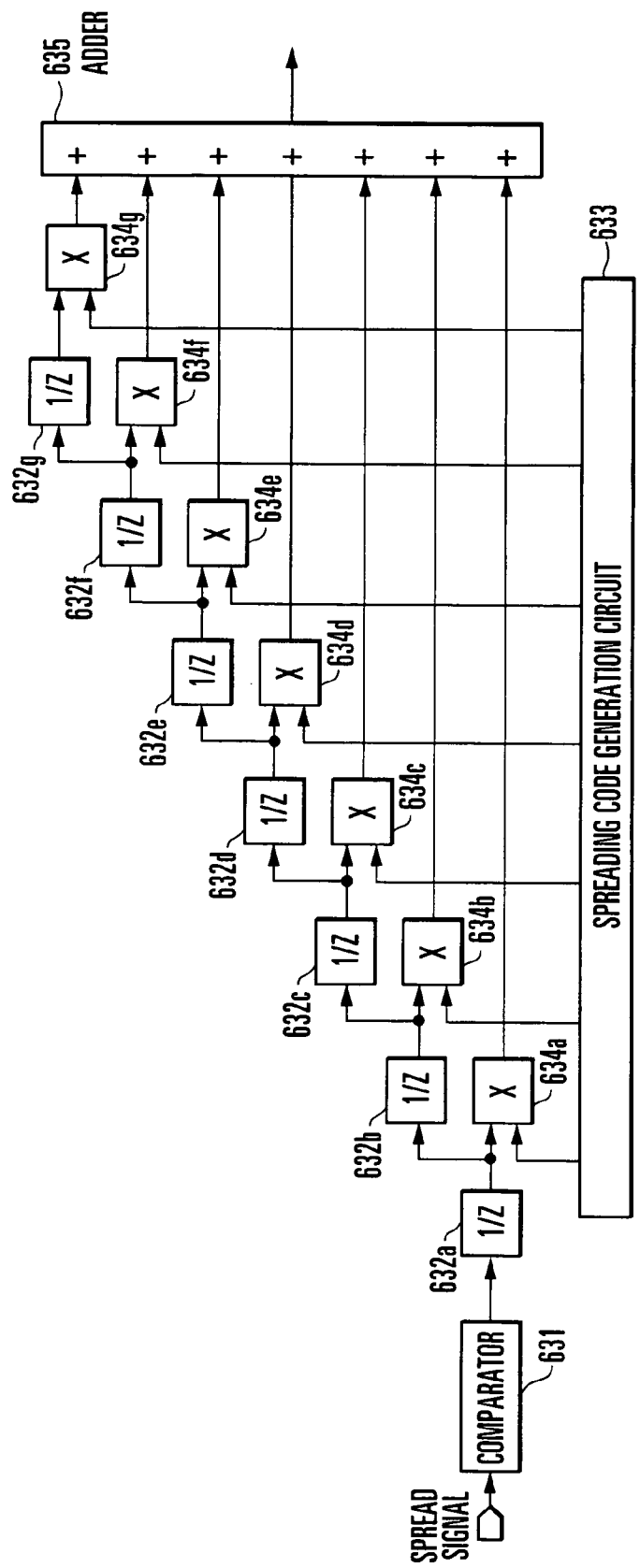
FIG. 28 is a block diagram showing an example of the configuration of a despreading means according to the eighth embodiment of the present invention.

FIG. 28 is a block diagram showing an example of the configuration of the despreading means 163 according to the eighth embodiment. In the example of FIG. 28, the length M of the spreading code C is 7. The despreading means 163 in FIG. 28 comprises a comparator circuit 631 which converts the high-frequency component ΔS of a spread signal input from the LNA 162 into a digital signal in synchronism with the first clock f1 having the same frequency as that of a clock used for spreading of the spread signal, (N−1) delay circuits 632a to 632g which output (N−1) signals obtained by delaying a signal output from the comparator circuit 631 by one cycle to (N−1) cycles (N is an integer of 2 or more) of the first clock f1, a spreading code generation circuit 633 which generates the spreading code C, N multipliers 634a to 634g which multiply signals output from the delay circuits 632a to 632g and the spreading code C output from the spreading code generation circuit 633 for respective signals, and an adder 635 which adds signals output from the multipliers 634a to 634g.

The comparator circuit 631 determines the level of an input signal every cycle of the first clock f1 on the basis of a predetermined threshold, converts a spread signal into high- or low-level 1-bit digital data, and outputs the data. The delay circuit 632a delays the signal output from the comparator circuit 631 by one cycle of the clock f1, and outputs the delayed signal to the delay circuit 632b and multiplier 634a. The operation of the delay circuits 632b to 632f is also the same. The delay circuit 632g delays a signal output from the delay circuit 632f by one cycle of the clock f1, and outputs the delayed signal to the multiplier 634g.

The spreading code generation circuit 633 generates the spreading code C. When a spreading code sequence used for spreading on the transmitting side is {1,0,0,1,1,1,0}, a spreading code sequence used for despreading is {−1,0,1,2, 1,0,1} from calculation of equation (3). Signals output from the delay circuits 632a to 632g and the spreading code C output from the spreading code generation circuit 633 are multiplied by the multipliers 634a to 634g for corresponding signals. The products of the multipliers 634a to 634g are added by the adder 635, which outputs the sum.

The peak detector 164 detects the peak of the signal output from the adder 635, and outputs a baseband signal.

Figure 29A:
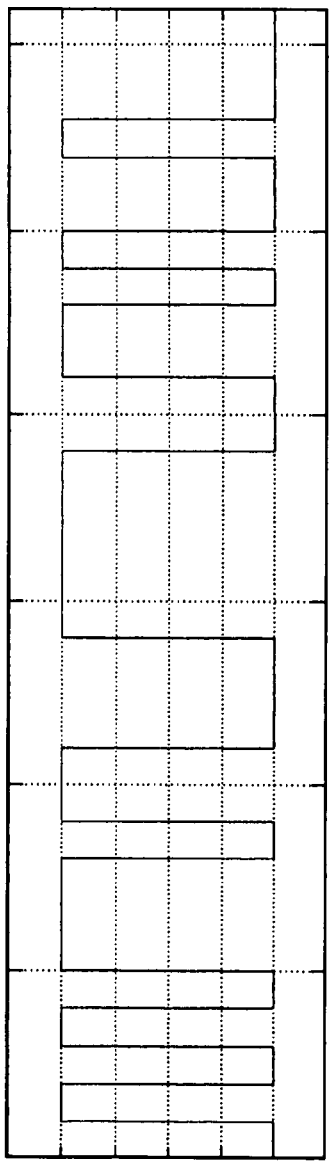
FIG. 29A is a signal waveform chart showing a spread signal to be transmitted.
Figure 29B:
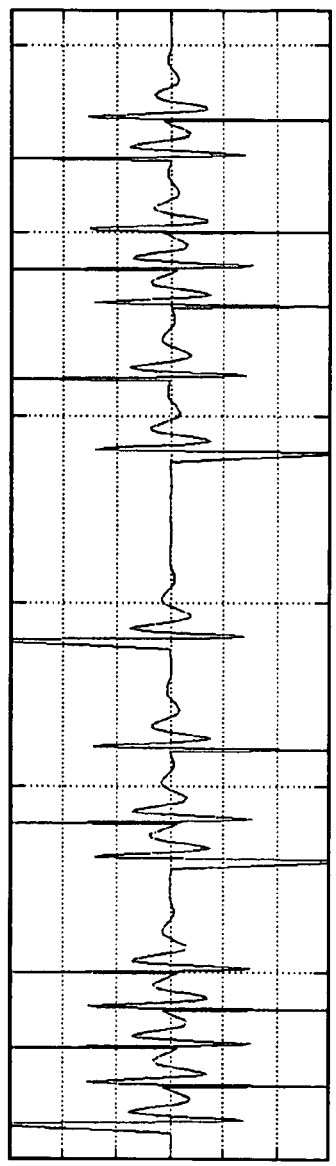
FIG. 29B is a signal waveform chart showing a received signal in the radio receiver according to the eighth embodiment of the present invention.
Figure 29C:
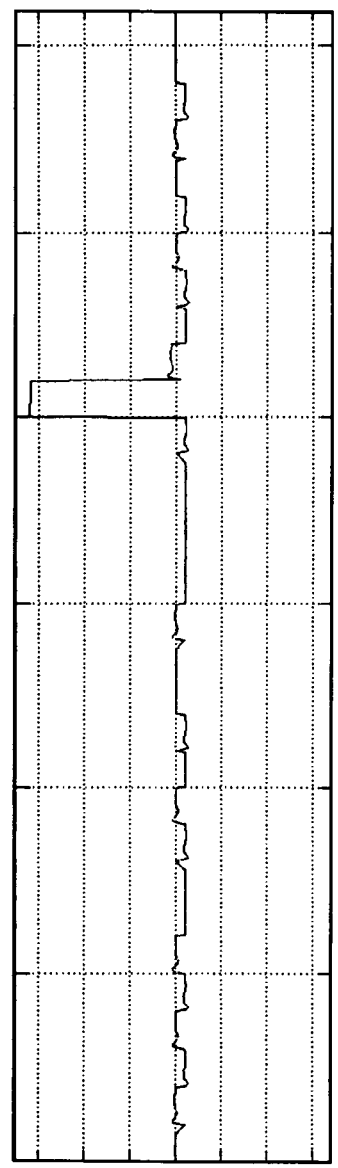
FIG. 29C is a signal waveform chart showing a despread signal in the radio receiver.

FIG. 29 shows the spread signal S to be transmitted, and representative signal waveforms at point Q (received signal) and point K (output of the despreading means 163) in the radio receiver 10 of FIG. 7. FIG. 29B shows a signal received by the antenna 161 of the radio receiver 10 as a result of transmitting the spread signal S shown in FIG. 29A from the antenna. When the despreading means 163 despreads the signal of FIG. 29B, a signal as shown in FIG. 29C is obtained. In FIG. 29C, a positive peak signal is attained only on the upper side from the center value, unlike FIGS. 25A and 26A.

Figure 30A:
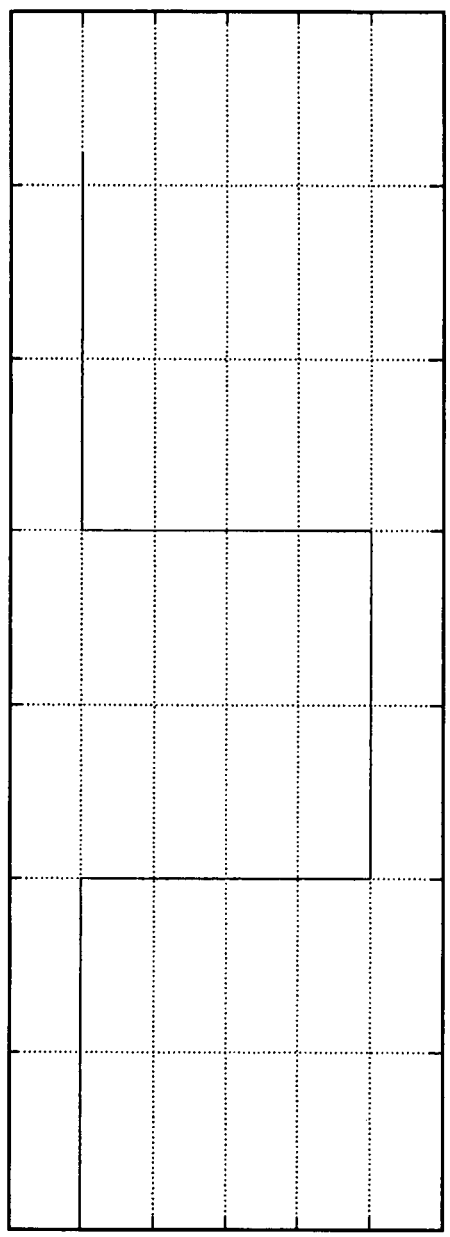
FIG. 30A is a signal waveform chart showing a data signal to be transmitted.
Figure 30B:
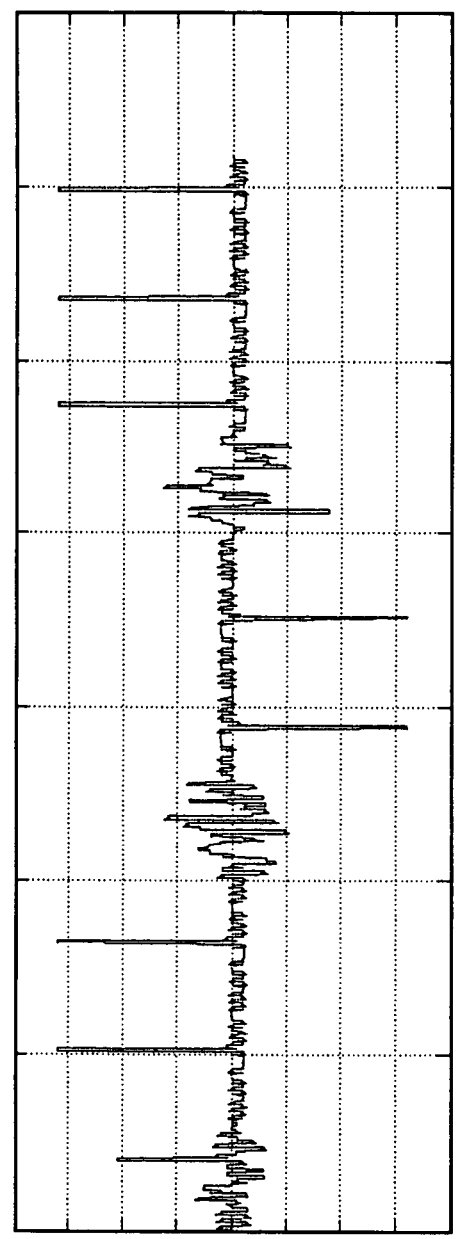
FIG. 30B is a signal waveform chart showing a despread signal in the radio receiver according to the eighth embodiment of the present invention.

FIG. 30 shows an example in which the time interval is prolonged from that in FIG. 29. FIG. 30A is a signal waveform chart showing a data signal (baseband signal) IN to be transmitted, and FIG. 30B is a signal waveform chart at point K (output of the despreading means 163) in the radio receiver 10.

As described above, according to the eighth embodiment, a peak signal of a polarity corresponding to high/low level of a transmission signal can be obtained using the spreading code C which satisfies equation (3). The eighth embodiment need not employ any integrating means for determining the phase of a despread signal, and the baseband signal can be demodulated even at a high chip rate of the spread signal.

Note that a sample-and-hold circuit which sequentially executes sample-and-hold operation in synchronism with the first clock f1 may replace the comparator circuit 631 and the delay circuits 632a to 632g in the despreading means 163 of the eighth embodiment.

Ninth Embodiment

The ninth embodiment of the present invention will be explained. In the second to eighth embodiments, a band of 100 MHz to 300 MHz in the main lobe of a spread signal spectrum extending from, e.g., DC to 300 MHz is transmitted. The transmission signal spectrum of the second to eighth embodiments is illustrated in FIG. 10.

Figure 31:
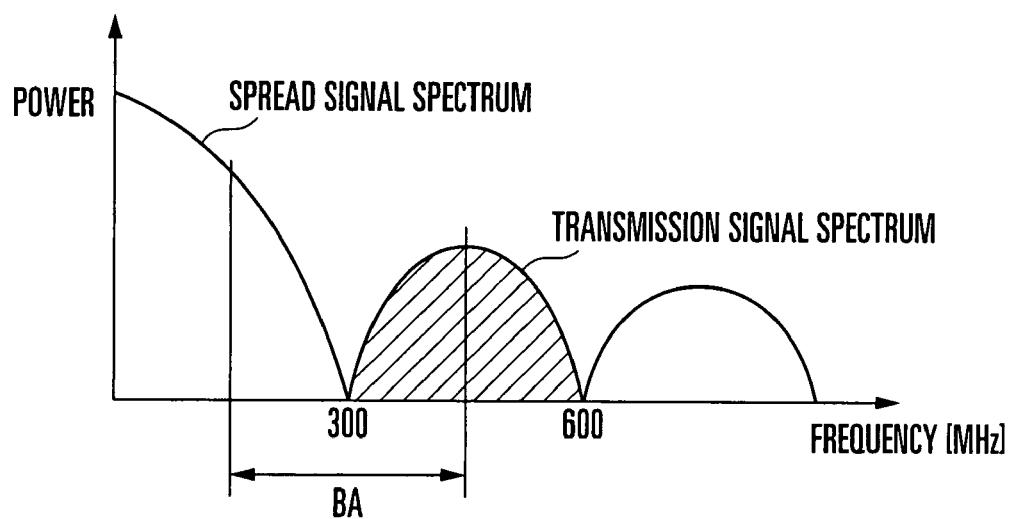
FIG. 31 is a graph showing a transmission signal spectrum according to the ninth embodiment of the present invention.
Figure 32:
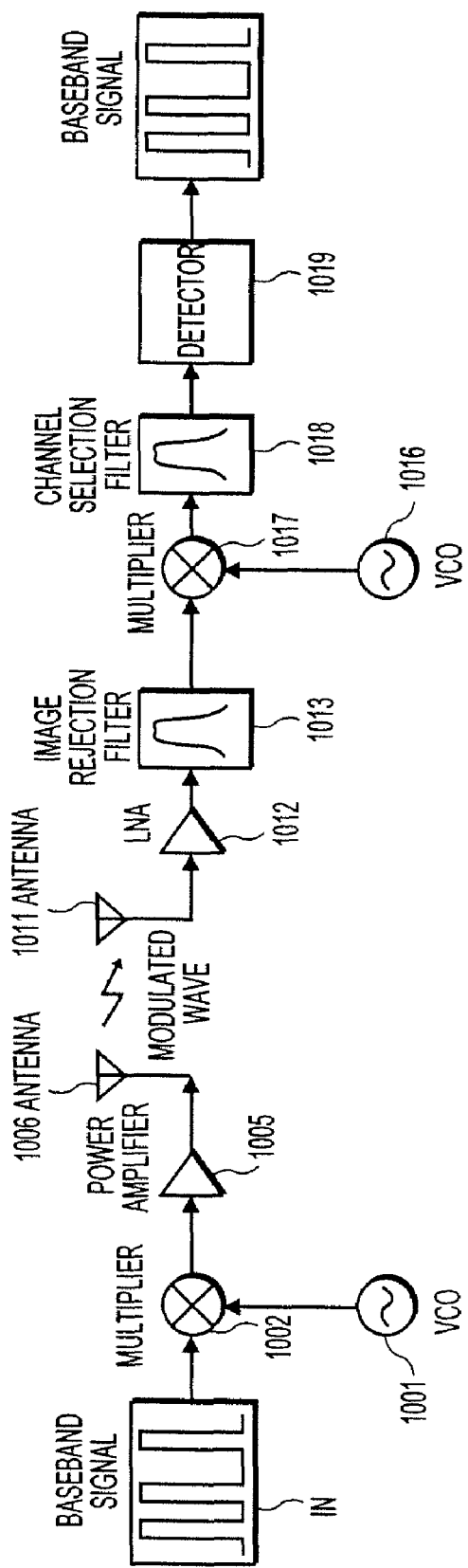
FIG. 32 is a block diagram showing an example of the configuration of a conventional radio communication system.

To the contrary, in the ninth embodiment, only an impulse signal in the nth (n is an integer of 2 or more) harmonic band out of the frequency band at a spread chip rate is output and transmitted from a signal generation means 113. The transmission signal spectrum of the ninth embodiment is illustrated in FIG. 31. In the example of FIG. 31, only the second harmonic band (300 to 600 MHz) at the chip rate is transmitted. The band at the bottom of the spread signal spectrum such as a band BA in FIG. 31 is transmitted, and when the transmission output is increased within a range where the output complies with a transmission output regulation by laws such as radio laws, the efficiency decreases. In the ninth embodiment, efficient transmission complying with the transmission output regulation can be done by transmitting only a signal in the nth harmonic band.

The present invention can be applied to radio communication for transmitting/receiving a digital signal by radio waves.

The invention claimed is:

1. A radio communication system comprising:
a radio transmitter including encoding means for encoding a digital signal to be transmitted, and a transmission antenna which transmits the signal encoded by said encoding means; and
a radio receiver including a reception antenna which receives the transmitted signal, and decoding means for performing decoding corresponding to encoding for the signal received by said reception antenna and restoring the digital signal, wherein communication is performed without using any carrier;
wherein said encoding means comprises spreading means for performing a spread spectrum process by multiplying the digital signal to be transmitted by a spreading code, and signal generation means for generating an impulse signal in response to rise and fall of a signal spread by said spreading means and outputting the impulse signal to said transmission antenna, and;

wherein said decoding means comprises despreading means for performing despreading for the signal received by said reception antenna by using a spreading code corresponding to a differentiated spread signal, and peak detection means for detecting a peak of the signal despread by said despreading means and restoring the digital signal,
wherein ΔS is the differentiated spread signal, C is a spreading code corresponding to the spread signal S, P is a correlation value between the differentiated spread signal ΔS and the spreading code C, and M is a code length of the spreading code C, $$P \approx \sum_{k=1}^{M} \left( \Delta S_k \cdot \sum_{r=k}^{M} C_r \right)$$

is established.

2. A radio communication system according to claim 1, in that said signal generation means outputs only an impulse signal in an nth (n is an integer not less than 2) harmonic band at a spread chip rate.

3. A radio receiver which receives a signal from a radio transmitter that encodes a digital signal to be transmitted and transmits the digital signal to be transmitted and transmits the digital signal without using any carrier, comprising:
a reception antenna which receives the transmitted signal; and
decoding means for performing decoding corresponding to encoding for the signal received by said reception antenna and restoring the digital signal;
wherein said radio receiver receives a signal from the radio transmitter which generates an impulse signal in response to rise and fall of a spread signal obtained by performing a spread spectrum process for the digital signal to be transmitted and transmits the impulse signal without using any carrier, and said decoding means comprises despreading means for performing despreading for the signal received by said reception antenna by using a spreading code corresponding to a differentiated spread signal, and peak detection means for detecting a peak of the signal despread by said despreading means and restoring the digital signal),
wherein ΔS is the differentiated spread signal, C is a spreading code corresponding to the spread signal S, P is a correlation value between the differentiated spread signal ΔS and the spreading code C, and M is a code length of the spreading code C, where $$P \approx \sum_{k=1}^{M} \left( \Delta S_k \cdot \sum_{r=k}^{M} C_r \right)$$

is established.

4. A radio communication method, comprising:
an encoding step of encoding a digital signal to be transmitted;
a transmission step of transmitting the signal encoded in the encoding by a transmitter;
a receiving step of receiving the transmitted signal by a receiver; and a decoding step of decoding corresponding to encoding for the signal received in the reception step and restoring the digital signal, wherein communication is performed without using any carrier;

wherein the encoding step comprises a spreading step of performing a spread spectrum process by multiplying the digital signal to be transmitted by a spreading code, and a signal generation step of generating an impulse signal in response to rise and fall of a signal spread in the spreading step, and the decoding step comprises a despreading step of performing despreading for the signal received in the reception step by using a spreading code corresponding to a differentiated spread signal, and a peak detection step of detecting a peak of the signal despread in the despreading step and restoring the digital signal, wherein $\Delta S$ is the differentiated spread signal, C is a spreading code corresponding to the spread signal S, P is a correlation value between the differentiated spread signal $\Delta S$ and the spreading code C, and M is a code length of the spreading code C, where $$P \approx \sum_{k=1}^{M} \left( \Delta S_k \cdot \sum_{r=k}^{M} C_r \right)$$

is established.

5. A radio communication method according to claim 4, wherein during the signal generation step, only an impulse signal in an nth (n is an integer not less than 2) harmonic band at a spread chip rate is output.

* * * * *

UNITED STATES PATENT AND TRADEMARK OFFICE
CERTIFICATE OF CORRECTION

PATENT NO. : 7,545,845 B2
APPLICATION NO. : 10/511690
DATED : June 9, 2009
INVENTOR(S) : Kenji Suzuki, Mamoru Ugajin and Tsuneo Tsukahara It is certified that error appears in the above-identified patent and that said Letters Patent is hereby corrected as shown below:

On the Title Page, in Item [75], under Inventors, after Inventor Name Tsuneo Tsukahara, please delete "Tokyo" and insert -- Kanagawa --.

Signed and Sealed this
Twenty-sixth Day of July, 2011

David J. Kappos
*Director of the United States Patent and Trademark Office*